(12) United States Patent
Hunn et al.

(10) Patent No.: US 12,198,212 B2
(45) Date of Patent: *Jan. 14, 2025

(54) SYSTEM AND METHOD FOR BLOCKCHAIN-BASED NETWORK TRANSITIONED BY A LEGAL CONTRACT

(71) Applicant: DocuSign, Inc., San Francisco, CA (US)

(72) Inventors: Peter Geoffrey Lerato Hunn, Dallas, TX (US); Daniel Charles Selman, Winchester (GB); Jerome Simeon, New York, NY (US)

(73) Assignee: Docusign, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,810

(22) Filed: Jun. 29, 2023

(65) Prior Publication Data

US 2023/0351535 A1 Nov. 2, 2023

Related U.S. Application Data

(63) Continuation of application No. 16/761,184, filed as application No. PCT/US2018/058813 on Nov. 1, 2018, now Pat. No. 11,699,201.

(Continued)

(51) Int. Cl.
*G06Q 50/18* (2012.01)
*G06F 16/23* (2019.01)
*H04L 9/32* (2006.01)

(52) U.S. Cl.
CPC ......... *G06Q 50/18* (2013.01); *G06F 16/2379* (2019.01); *H04L 9/32* (2013.01)

(58) Field of Classification Search
CPC ........................... G06F 16/2379; G06Q 50/18
(Continued)

(56) References Cited

U.S. PATENT DOCUMENTS 5,892,900 A 4/1999 Ginter et al.
6,640,304 B2 10/2003 Ginter et al.
(Continued)

OTHER PUBLICATIONS

Australian Office Action, IP Australia Patent Application No. 2018360802, Mar. 11, 2021, 4 pages.
(Continued)

*Primary Examiner* — Zi Ye
(74) *Attorney, Agent, or Firm* — Shumaker & Sieffert, P.A.

(57) ABSTRACT

A system and method for transitioning a distributed ledger network according to a legal contract that includes: establishing a contract, which comprises generating a set of programmable clauses for the contract by implementing a templating system comprised of a template model that contains the logic of each programmable clause of the set of programmable clauses; operating a distributed ledger network between participants, wherein the distributed ledger network is configured with an application model that maps to the template model; updating the contract state; updating the distributed ledger network according to the application model; in response to at least one update to the contract state, recording an update to the distributed ledger network; and in response to at least one contract-associated update in the distributed ledger network, initiating execution of at least one programmable clause of the contract and recording a subsequent update to the distributed ledger network.

20 Claims, 33 Drawing Sheets

Related U.S. Application Data

(60) Provisional application No. 62/651,165, filed on Apr. 1, 2018, provisional application No. 62/643,647, filed on Mar. 15, 2018, provisional application No. 62/639,412, filed on Mar. 6, 2018, provisional application No. 62/618,483, filed on Jan. 17, 2018, provisional application No. 62/609,341, filed on Dec. 22, 2017, provisional application No. 62/580,407, filed on Nov. 1, 2017.

(58) Field of Classification Search
USPC .......................................................... 705/311
See application file for complete search history.

(56) References Cited

U.S. PATENT DOCUMENTS

| | | | |
|---|---|---|---|
| 7,433,838 | B2 | 10/2008 | Welsh et al. |
| 7,756,772 | B1 | 7/2010 | Konopnicki et al. |
| 7,831,573 | B2 | 11/2010 | Lillibridge et al. |
| 8,086,866 | B2 | 12/2011 | Jakobsson |
| 8,285,681 | B2 | 10/2012 | Prahlad et al. |
| 9,356,965 | B2 | 5/2016 | Kjeldaas |
| 9,432,192 | B1 | 8/2016 | Pogde et al. |
| 9,483,455 | B1 | 11/2016 | Bastide et al. |
| 10,445,698 | B2 | 10/2019 | Hunn |
| 2002/0091539 | A1 | 7/2002 | Yin et al. |
| 2002/0184504 | A1 | 12/2002 | Hughes |
| 2007/0250337 | A1 | 10/2007 | Karamchedu et al. |
| 2009/0234662 | A1 | 9/2009 | Stieber et al. |
| 2010/0268528 | A1 | 10/2010 | Raskina et al. |
| 2011/0307278 | A1 | 12/2011 | Clarke et al. |
| 2012/0303969 | A1 | 11/2012 | Jakobsson |
| 2014/0164255 | A1 | 6/2014 | Daly et al. |
| 2015/0379510 | A1 | 12/2015 | Smith |
| 2016/0028552 | A1 | 1/2016 | Spanos et al. |
| 2016/0034519 | A1 | 2/2016 | Besch et al. |
| 2016/0110261 | A1 | 4/2016 | Parab et al. |
| 2016/0117471 | A1 | 4/2016 | Belt et al. |
| 2016/0283941 | A1 | 9/2016 | Andrade |
| 2017/0103167 | A1 | 4/2017 | Shah |
| 2017/0103468 | A1 | 4/2017 | Orsini et al. |
| 2017/0232300 | A1* | 8/2017 | Tran ........................ G06F 1/163 434/247 |
| 2017/0236120 | A1 | 8/2017 | Herlihy et al. |
| 2017/0287090 | A1 | 10/2017 | Hunn et al. |
| 2017/0331896 | A1 | 11/2017 | Holloway et al. |
| 2018/0005186 | A1 | 1/2018 | Hunn |
| 2018/0174255 | A1 | 6/2018 | Hunn et al. |
| 2018/0315141 | A1 | 11/2018 | Hunn et al. |
| 2018/0365201 | A1 | 12/2018 | Hunn et al. |
| 2019/0013932 | A1* | 1/2019 | Maino ................... H04L 9/3242 |
| 2019/0080392 | A1 | 3/2019 | Youb et al. |
| 2019/0108140 | A1* | 4/2019 | Deshpande ......... G06F 12/1408 |
| 2019/0122317 | A1 | 4/2019 | Hunn et al. |
| 2019/0358515 | A1 | 11/2019 | Tran et al. |
| 2020/0057994 | A1 | 2/2020 | Hunn |
| 2020/0104296 | A1 | 4/2020 | Hunn et al. |

OTHER PUBLICATIONS

Grigg, I., "The Ricardian Contract", Proceedings. First IEEE International Workshop on Electronic Contracting, 2004.
International Preliminary Report on Patentability from International Application No. PCT/US2018/058813 dated May 5, 2020, 6 pp.
International Search Report and Written Opinion, Patent Cooperation Treaty No. PCT/US2018/058813, Jan. 16, 2019, 11 pages.
Ron White, How Computers Work, 15 Oct. 15, 2003, Que Publishing, 7th Ed, p. 4 (Year: 2003).
Prosecution History from U.S. Appl. No. 16/761,184, dated May 24, 2022 through Jun. 2, 2023, 83 pp.

* cited by examiner

```
Record #4
Entity      0xD19DD815a748744C805A232169eb20fdf5a3e58a
address

Payload {   "contractId" : "5bd80f086ac47d0028519021",
            "organizationId": "5a88689170409d0001fea53f",
            "userId": "5a89399139015f00019ae607",
            "timestamp" : "2018-10-30T08:14:25.559Z",
            "data": "  {\"documentHash\" : \"4478051facde25fe36b4cacbdc775960fbea"
            "$class": "io.clause.common.audit.SaveContract" }
```

```
const smartContract =
`pragma solidity ^0.4.17;
 contract auditLog {
   struct LogEntry {
     address entityAddress; string payload;
   }

LogEntry[] public logEntries;
   function push(address entityAddress, string payload) public returns (uint rowNumber) {
      LogEntry memory newLogEntry; newLogEntry.entityAddress = entityAddress;
newLogEntry.payload  = payload;   return logEntries.push(newLogEntry)-1;
   }
   function getSize() public constant returns(uint size) {
       return logEntries.length; }}`;
```

FIGURE 4A

```
Block Details

|INVOKE

UUID
|e64eeffffb82af12f59af3ae18b50b2c5673f7f2b3f94917b228605985d53a8a

Chaincode ID(s)
|clause

Input
|("storeAuditEvent", "5b9b88a9aed698c199ddd27";
|{\"contractId\":\5b9b88a9aed698c199ddc27\",\"organizationId\":\"5a88689170409d0001f
|ea53f\",
|\"timestamp\":\"2018-09-14T10:11:19.833Z\",\"$class\":\"io.clause.common.auditContr
|actLifecycleStatusChanged\",\"oldStatus\":\"DRAFTING\",\"newStatus\:…

Output
|WRITE 5b9b88a9aed698c199ddd27-AuditEvent =
|{"contractID":"5b9b88a9aed698c199ddd27","organizationld":"5a88689170409d0001fea53f"
|,"timestamp":"2018-09-14T10:11:19.833Z","$class":"io.clause.common.auditContractLif
|ecycleStatusChanged","oldStatus":"DRAFTING","newStatus":…
```

FIGURE 4B

```
namespace org.sampleproject.latedeliveryandpenalty import org.namespace.contract.* from URL
import org.namespace.runtime.* from URL
import org.namespace.time.* from URL /**
 * Defines the data model for the LateDeliveryAndPenalty template.
 * This defines the structure of the abstract syntax tree that the
 * parser for the template can generate from input source text.
 */
@Template("latedeliveryandpenalty")
concept TemplateModel {
  /* Does the clause include a force majeure provision?  */
  o Boolean forceMajeure
  /* For every penaltyDuration that the goods are late   */
  o Duration penaltyDuration
  /* Seller pays the buyer penaltyPercentage % of the value of the goods   */
  o Double penaltyPercentage
  /* Up to capPercentage % of the value of the goods    */
  o Double capPercentage
  /* If the goods are >= termination late then the buyer may terminate the contract
*/
  o Duration termination
}
```

FIGURE 16

```
/** * Defines the data model for the LateDeliveryAndPenalty template. *This defines the
structure of the abstract syntax tree that the parser for the template must generate from input
source text. */@Template("latedeliveryandpenalty")concept TemplateModel {

/* Does the clause include a force majeure provision?                        */
    o Boolean forceMajeure /** For every penaltyDuration that the goods are late                        */
    o Duration penaltyDuration /* Seller pays the buyer penaltyPercentage % of the value of the goods    */
    o Double penaltyPercentage /* Up to capPercentage % of the value of the goods                            */
    o Double capPercentage /**If the goods are >= termination late then the buyer may terminate the contract   */
    o Duration termination}
```

FIGURE 17A

In case of delayed delivery[{" except for Force Majeure cases,":? forceMajeure}] the Seller shall pay to the Buyer for every [{penaltyDuration}] of delay penalty amounting to [{penaltyPercentage}]% of the total value of the Equipment whose delivery has been delayed. Any fractional part of a [{fractionalPart}] is to be considered a full [{fractionalPart}]. The total amount of penalty shall not however, exceed [{capPercentage}]% of the total value of the Equipment involved in late delivery. If the delay is more than [{termination}], the Buyer is entitled to terminate this Contract.

FIGURE 17B

"In case of delayed delivery except for Force Majeure cases, the Seller shall pay to the Buyer for every 2 weeks of delay penalty amounting to 10.5% of total value of the Equipment whose delivery has been delayed. Any fractional part of a week is to be considered a full week. The total amount of penalty shall not, however, exceed 55% of the total value of the Equipment involved in late delivery. If the delay is more than 10 weeks, the Buyer is entitled to terminate this Contract."

FIGURE 17C

```
/** * Defines the input data required by the template    */
transaction LateDeliveryAndPenaltyRequest {

/**   * Are we in a force majeure situation?
*/ o Boolean forceMajeure

/**   * What was the agreed delivery date for the goods?
*/ o DateTime agreedDelivery /**   * If the goods have been delivered, when where they delivered?
*/ o DateTime deliveredAt optional /**   * What is the value of the goods?
*/ o Double goodsValue}
```

FIGURE 18A

```
/** * Defines the output data for the template    */
transaction LateDeliveryAndPenaltyResponse {

/**   * The penalty to be paid by the seller
*/ o Double penalty

/**   * Whether the buyer may terminate the contract
*/ o Boolean buyerMayTerminate}
```

FIGURE 18B

```
* Execute the clause
* @param {Context} context - the context
* @param {io.clause.latedeliveryandpenalty.LateDeliveryAndPenaltyRequest} context.request - the
incoming request
* @param {io.clause.latedeliveryandpenalty.LateDeliveryAndPenaltyResponse} context.response -
the response
* @ClauseLogic
function execute(context) {
  logger.info(context);
  var req = context.request;
  var res = context.response;
  var data = context.data;
  var now = moment(req.timestamp);
  var agreed = moment(req.agreedDelivery);

res.buyerMayTerminate = false;
  res.penalty = 0;

if (req.forceMajeure) {
        logger.info('forceMajeure');
        res.buyerMayTerminate = true; }
  if (!req.forceMajeure && now.isAfter(agreed)) {
        logger.info('late');
        logger.info('penalty duration unit: ' + data.penaltyDuration.unit);
        logger.info('penalty duration amount: ' + data.penaltyDuration.amount);
        // the delivery is late
        var diff = now.diff(agreed, data.penaltyDuration.unit);
        logger.info('diff:' + diff);

var penalty = (diff / data.penaltyDuration.amount) * data.penaltyPercentage/100 *
req.goodsValue;
        // cap the maximum penalty
        if (penalty > data.capPercentage/100 * req.goodsValue) {
        logger.info('capped.');
        penalty = data.capPercentage/100 * req.goodsValue;
        }
        res.penalty = penalty;
        // can we terminate?
        if (diff > data.termination) {
            logger.info('buyerMayTerminate.');
        res.buyerMayTerminate = true;
        }
  }
}
```

FIGURE 24

```
{
"clause":"helloworld@0.0.3-c8d9e40fe7c5a479d1a80bce2d2fdc3c8a240ceb44a031d38cbd619e9
b795b60",
"request":{  "$class":"io.clause.helloworld.Request",  "input":"World" }, "response":{
"$class":"io.clause.helloworld.Response",    "output":"Hello Dan World",
"transactionId":"cf1dabb5-d604-4ffa-8a87-8333e77a735a",
"timestamp":"2017-10-31T10:47:42.055Z"  }
}
```

FIGURE 25 template.tem:

```
Name of the person to greet: [{name}].
Thank you!
```

Sample.txt:

```
Name of the person to greet: "Dan".
Thank you!
```

```
parse --template ~/dev/template-library/helloworld/ --dsl
~/dev/template-library/helloworld/sample.txt
Setting clause data: {"$class":"io.clause.helloworld.TemplateModel","name":"Dan"}
```

Attempting to parse invalid data can result in line and column information for the syntax error:

Sample.txt:

```
FUBAR Name of the person to greet: "Dan".
Thank you!
```

```
{ Error: invalid syntax at line 1 col 1:

FUBAR  Name of the person to greet: "Dan".
  ^
Unexpected "F"
```

FIGURE 26

| | |
|---|---|
| Participants | Asset registry for org.sampleproject.perishablegoodsShipment |
| Grower | ID     Data |
| Importer | SHIP_00 1 |
| Shipper | |
| Assets | |
| Shipment | |
| Transactions | |
| All Transactions | |

```
{
  "class": "org.sampleproject.perishablegoods.Shipment",
  "shipomentId": "SHIP_001",
  "status": "ARRIVED",
  "grower": "resource:org.sampleproject.perishablegoods.Grower#farmer@email.com",
  "importer": "resource:org.sampleproject.perishablegoods.Importer#supermarket@email.com",
  "termperatureReadings": [
    {
      "class": "org.sampleproject.perishablegoods.TemperatureReading",
      "centigrade": 2,
      "shipment": "resource:org.sampleproject.perishablegoods.Shipment#SHIP_001",
      "transactionId":
              "b4dccaa3a56c3e887ef1a8fa4cddbea8ec9715d53e1ac2991",
      "timestamp": "2017-12-10T13:37:59.643Z"
    },
    {
      $class" "org.sampleproject.perishablegoods.TemperatureReading",
      "centigrade": 4,
      "shipment": "resource:org.sampleproject.perishablegoods.Shipment#SHIP_001",
      "transactionId": "f90fecb02565d2d18541b4cc2ff8d051f4d716072ef6d26",
      "timestamp": "2017-12-10T13:38:14:869z"
    },
    {
      "$class": "org.sampleproject.perishablegoods.TemperatureReading",
      "centigrade": 6,
      "shipment": "resource:org.sampleproject.perishablegoods.Shipment#SHIP_001",
      "transactionId": "cb07cfab4f745078696afb80dd064986d57a638733",
      "timestamp": "2017-12-10T13:13:38:38.505Z"
    }
  ],
  "smartClause": "perishable-goods/shipping-contract.txt"
}
```

FIGURE 27B

Asset registry for org.sampleproject.perishablegoods.Grower

| ID | Data |
|---|---|
| farmer@email.com | `{`<br>`"class": "org.sampleproject.perishablegoods.Grower",`<br>`"email": "farmer@email.com",`<br>`"address": {`<br>`        "$class": "org.sampleproject.perishablegoods.Address",`<br>`        "country": "USA"`<br>`},`<br>`"accountBalance": 4500`<br>`}` |

FIGURE 27C

```
{
    "$class": "org.sampleproject.perishablegoods.TemperatureReading",
    "centigrade": 10,
    "shipment": "resource:org.sampleproject.perishablegoods.Shipment#SHIP_001"
}
```

FIGURE 27D

```
/**
 * A temperature reading for a shipment. e.g. received from a
 * device within a temperature controlled shipping container
 */
transaction ShipmentReceived extends ShipmentTransaction{
        o Double centigrade
}

/**
 * A notification that a shipment has been received by the
 * importer and that funds should be transferred from the importer
 * to the grower to pay for the shipment.
 */
transaction ShipmentReceived extends ShipmentTransaction{
        o Integer unitCount
}

/**
 * The calcultaion of a price
 */
transaction PriceCalculation extends ShipmentTransaction{
        o Double totalPrice
        o Double penalty
        o Boolean late
}

/**
 * A shipment being tracked as an asset on the ledger
 */
asset Shipment identified by shipmentId {
        o String shipmentId
        o ShipmentStatus
        --> Grower grower
        --> Importer importer
        o TemperatureReading[] temperatureReadings optional /**
 * the link to the clause for this shipment
 */
        o String smartClause
}
```

FIGURE 27E

```
/**
 * A shipment has been received by an importer
 * "param {org.sampleproject.perishablegoods.ShipmentReceived}
 * shipmentReceived - the ShipmentReceived transaction
 * @transaction
 */
function payOut(shipmentReceived) { var shipment = shipmentReceived.shipment;
    console.log('Received at: ' + shipmentReceived.timestamp);

// set the status of the shipment
    shipment.status = 'ARRIVED';
    var server = "http://localhost:6001";
    // var server = "http://192.168.1.111:6001";
    // execute the smart clause
    return post( server + '/execute/' + shipment.smartClause,
shipmentReceived, {permitResourcesForRelationships: true})
        .then(function (result) {
            // console.log('result: ' + JSON.stringify(result));
            var totalPrice = result.body.response.totalPrice;
            console.log('Payout: ' + totalPrice);
            shipment.grower.accountBalance += totalPrice;
            shipment.importer.accountBalance-= totalPrice;
```

FIGURE 27F

On receipt of the shipment[{shipment}] the importer [{importer}] pays the grower [{grower}] [{unitPrice}] USD per [{unit}]. The shipment must contain between [{minUnits}] and [{maxUnits}] [{unit}] of [{product}].

Shipping containers used must be temperature controlled, and temperature readings must be logged at least [{temperatureReadingFrequency}] per [{duration}].

Shipments that arrive after {[dueDate}] are to be considered spoiled and must be arranged to be returned to or disposed of by grower at cost to grower.

Shipments that have a temperature reading less than the agreed minimum temperature of [{minTemperature}] degrees centigrade have a price penalty applied calculated using Formula 1 below. The minimum breach penalty factor to be used is [{minPenaltyFactor}].

Shipments that have a temperature reading greater than the agreed maximum temperature of [{maxTemperature}] degrees centigrade have a price penalty applied calculated using Formula 2 below. The maximum breach penalty factor to be used is [{maxPenaltyFactor}].

Formula 1: Maximum Temperature Breach Penalty:
    penalty = number of shipment units x difference between maximum temperature and agreed maximum temperature x maximum breach penalty factor Formula 2: Minimum Temperature Breach Penalty:
    penalty = number of shipment units x difference between minimum temperature and agreed minimum temperature x minimum breach penalty factor

FIGURE 27G

```
/**
 * Defines a contract between a Grower and an Importer to ship
 * using a Shipper, paying a set unit price. The unit price is
 * multiplied by a penalty factor proportional to the deviation
 * from the min and max negotiated temperatures for the shipment.
 */
@sampleTemplateModel("perishable-goods")
concept TemplateModel{
        --> Grower grower
        --> Importer importer
        --> Shipment shipment
        o DateTime dueDate
        o Double unitPrice
        o Unit unit
        o Integer minUnits
        o Integer maxUnits
        o String product
        o Integer temperatureReadingFrequency
        o Duration duration
        o Double minTemperature
        o Double maxTemperature
        o Double minPenaltyFactor
        o Double maxPenaltyFactor
}
```

FIGURE 27H

```
/**
 * Execute the clause
 * @param {Context} - the sample context
 * @param {org.sampleproject.perishablegoods.ShipmentReceived}
 * context.request - the incoming request
 * @param {org.sampleproject.perishablegoods.PriceCalculation}
 * context.response - the response
 * @sampleClauseLogic
 */
function payOut(context) {
      logger.info(context);

var shipmentReceived = context.request;
      var shipment = shipmentReceived.shipment;
      var res = context.response;
      res.shipment = shipment;
      var data = context.data;
      var payOut = data.unitPrice * shipmentReceived.unitCount;

logger.info('Base payOut; ' + payOut);
      logger.info('Received at: ' + shipmentReceived.timestamp);
      logger.info('Contract arrivalDateTime: ' + data.dueDate);

if(shipmentReceived.unitCount < data.minUnits ||
          shipmentReceived.unitCount > data.maxUnits) {
              throw new Error('Units received out of range for the contract.');
      }
```

FIGURE 27I

SYSTEM AND METHOD FOR BLOCKCHAIN-BASED NETWORK TRANSITIONED BY A LEGAL CONTRACT

This Application is a continuation of U.S. patent application Ser. No. 16/761,184, filed May 1, 2020, which is a national stage entry of PCT International Application No. PCT/US18/58813, filed Nov. 1, 2018, which claims the benefit of U.S. Provisional Application No. 62/580,407, filed Nov. 1, 2017; U.S. Patent Application No. 62/618,483, filed Jan. 17, 2018; U.S. Patent Application No. 62/609,341, filed Dec. 22, 2017; U.S. Patent Application No. 62/639,412, filed Mar. 6, 2018; U.S. Patent Application No. 62/643,647, filed Mar. 15, 2018; and U.S. Patent Application No. 62/651,165, filed Apr. 1, 2018; all of which are incorporated by reference in their entireties.

TECHNICAL FIELD

This invention relates generally to the field of blockchain and distributed ledger technologies, and more specifically to a new and useful system and method for a blockchain-based network transitioned by a legal contract.

BACKGROUND

A contract is a legally enforceable agreement to exchange value such as goods, services, or property. Contracts are a fundamental tool for coordinating economic activity. Four of the basic stages of contracting are: formation, performance, renegotiation and amendment, and termination. Written contracts are typically paper-based or computer-based digital representations of paper-based contracts often signed and stored in PDF format. Contracts are made of up numerous distinct clauses that establish basic information and contain the parties' rights and obligations. Clauses may be made up of a single sentence or a paragraph, and are grouped together topically, and often hierarchically, by sections. Contracts are typically structured so that clauses make intra-document references to one another, either in the same section or across different sections. Modern contracts are typically made up of the following clauses and sections: a preamble, identification of the parties, recitals, definitions, the exchange of value and the parties' other obligations (including actions the parties should and should not undertake), representations, warranties, conditions, and several boilerplate clauses such as choice of law, assignment, and entire agreement (merger) clauses. Other clauses may also be used.

Contractual clauses are currently static expressions. Although the external environment and the parties' conduct pursuant to the contract may change over time, the terms and conditions of the clauses do not change after the contract is formed unless there is a legal amendment (modification). Contract amendment may require the assent of both parties; but it may be unilateral. Accordingly, under existing technology and practices the contract serves as a static documentary record of the agreement as of the date of execution.

Legal contracts are also typically unable to utilize data. The computerization of commerce and commercial activities means that data is increasingly available and used in all aspects of business. This is likely to increase significantly with the advent and maturation of the 'Internet of Things', particularly in industry, which provides real-time or near real-time data as to the state of commercial activities. Legal contracts that are stored on paper are isolated/siloed from data as they have no native means of connecting to any form of electronically stored information or computation. Contracts that are written and stored in electronic form are similarly unable to utilize data; despite being in electronic form, such contracts are nonetheless just as static as paper-based contracts as they have no electronic means of responding to, acting upon, receiving, or sending data after they are formed.

A variety of electronic systems may be used to assemble, manage, and analyze legal contracts. Electronic document assembly programs provide standardized templates that users complete with a contract's specific terms to generate an executable agreement. Software also analyzes contracts terms and conditions to ensure consistency and whether an agreement contains certain contract rights or fulfills specific business objectives. Contract Lifecycle Management (CLM) or contract management software creates a centralized repository of documents that captures/extracts data, often from paper-based documents, relevant to the user's obligations under each legal contract. That data used to monitor the performance of obligations, manage business milestones, and provide some basis for business analytics. CLM software creates a system and layer of software and data separate from the actual contracts the CLM system assists in managing. No aspect of CLM software, by itself, has the ability to constitute or amend legally enforceable contract rights, obligations, or parameters—distinct from the underlying contracts that are managed. Management is largely performed manually by users of the CLM software.

Various initiatives are also underway to automate and execute aspects of contract performance, often by using distributed ledger implementations, sometimes referred to as "smart contracts". Distributed ledgers (also known as "shared ledgers", "replicated ledgers" or, in specific implementations, "blockchains"), are a type of database architecture where a single record of data is spread throughout and viewable by numerous entities, and typically updated according to a robust consensus protocol/algorithm. Despite many of these more recent developments, legal contracts are typically still executed and managed in their static states (with the same terms and conditions as they are initially formed). In addition, despite the use of the term 'contract', smart contracts are often simply coded scripts (often with state) that execute and perform processes or transactions on a blockchain or distributed ledger and are divorced from any legally enforceable contract and the contractual rights and obligations of any party. The term 'contract' in the foregoing sense may therefore be somewhat of a misnomer.

Thus, there is a need in the digital contract management field to create a new and useful system and method for a blockchain-based network transitioned by a legal contract. This invention provides such a new and useful system and method.

BRIEF DESCRIPTION OF DRAWINGS

The present invention is illustrated by way of example, and not by way of limitation, in the figures of the accompanying drawings in which:

FIG. 4A depicts a pre-formation 'save contract' event object instantiated on a contract state system and shared on a blockchain distributed ledger network and an exemplary associated on-chain script for instantiating an on-chain audit log of contract events; and FIG. 4B depicts an event object indicating a state change of a contract from 'drafting' to 'signing' status instantiated on a contract state system instantiated on a blockchain distributed ledger network.

FIG. 16 is an example template model;

FIG. 17A is an exemplary template model for a late delivery and penalty clause in a typical legal contract;

FIG. 17B is an exemplary marked up template (template grammar) for a late delivery and penalty clause in a typical legal contract;

FIG. 17C is an instance of the contract clause for a late delivery and penalty clause in a typical legal contract;

FIG. 18A is an exemplary template request;

FIG. 18B is an exemplary template response;

FIG. 24 is an example of using a JavaScript function to implement the template logic;

FIG. 25 is an object showing an exemplary request and response;

FIG. 26 is a parsing result that is a JSON serialized instance of a template model;

FIG. 27B is an example of a shipment being tracked on the blockchain network for the example for a perishable goods use case;

FIG. 27C shows participant state stored on the blockchain for the perishable goods use case;

FIG. 27D is a simulation of submitting an exemplary IoT transaction for the perishable goods use case;

FIG. 27E is a template model in the modeling language for the perishable goods use case;

FIG. 27F is a transaction processor function for the ShipmentReceived transaction for the perishable goods use case;

FIG. 27G is an exemplary template grammar for the "template" for the perishable goods use case;

FIG. 27H is a template model for an exemplary perishable goods template; and

FIG. 27I is an exemplary business logic for a template written in JavaScript for the perishable goods use case.

DESCRIPTION OF THE EMBODIMENTS

The following description of the embodiments of the invention is not intended to limit the invention to these embodiments but rather to enable a person skilled in the art to make and use this invention.

1. Overview

The system and method functions to enable legal contracts to be managed and executed in a manner in which at least part of the execution of the legal contract is automatable in association with a blockchain or distributed ledger network (BDL). A contract is preferably at least partially computable/machine readable. Such contracts may be termed 'data-driven', 'computable', 'electronic' and/or 'smart'. Execution of a contract is preferably achieved by exposing external data to the contract to drive the computable aspects of the contract. A contract may be composed of one or many executable logic clauses. These logic clauses may take the form of programmable clauses as outlined in U.S. patent application Ser. No. 15/476,791, filed 31 Mar. 2017, which is hereby incorporated in its entirety by this reference. The system and method may include a contract management platform, a contract repository system, a contract state system, a templating system, a compiler, an execution engine, and a blockchain/distributed ledger network.

Herein, blockchain/distributed ledger (BDL) is used to refer to distributed ledgers and/or more specific consensus-based blockchain solutions, wherein any suitable variation of such systems may be used. References to BDL systems, platforms, integrations, transactions and the like could be distributed ledger variations or blockchain variations. Cryptographic databases, and/or other suitable systems with BDL-like features may be additionally or alternatively used as the BDL components.

Automated transactions are preferably executed according to the terms of a legally binding agreement to provide companies with certainty and the ability to be compensated if something goes wrong. Traditional smart contracts that are executed apart from a legal agreement may be fully integrated into an enterprise digital transformation strategy. Fundamental transformation through the system and method may enable consolidating systems end-to-end and involving a company's legal agreements.

Figure 7:
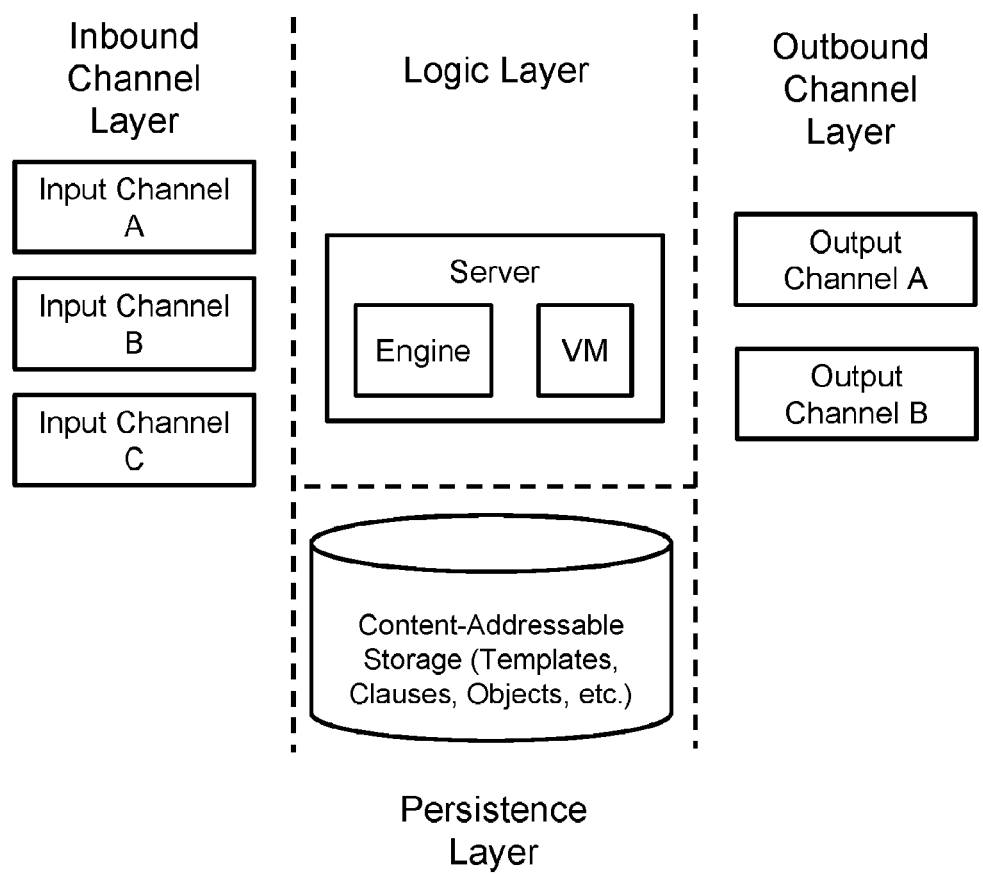
FIG. 7 is a depiction of the exemplary 'layers' of the system and method.

As depicted in exemplary form by FIG. 7, the system and method preferably operate through components that can be generally characterized by a number of operational layers. An inbound channel (data) layer may comprise inputs to a contract from a variety of external sources. A business logic (computation) layer may comprise executing contracts based upon inbound channel inputs. A persistence layer may comprise maintaining and storing all contract-associated data. An outbound channel (transaction) layer may comprise executing external actions from the logic of the contract (e.g., API calls, transactions on a blockchain/distributed ledger, etc.).

The inbound channel (data) layer is responsible for receiving events from the outside world, and transforming them into a representation suitable for execution. This includes dealing with timers and scheduled execution of a contract. It can also perform role mapping if necessary from the user roles defined by the external system to the user roles required by the computing system. Examples of inbound channel activity may include (but are not limited to): HTTP POST, JMS dequeue, Cron timer, invocation from a BDL or oracle system, invocation from an API, invocation from an Internet of Things or network-connected device, and invocation from a blockchain or distributed ledger.

The persistence layer exposes a basic create/read/update/delete API over content-addressable storage. Implementations could be backed by a centralized database (e.g., such as a centralized/trusted database like MongoDB), a blockchain/distributed ledger such as Hyperledger Fabric, (distributed permissioned) or Ethereum mainnet (distributed permissionless) or InterPlanetary File System (distributed, permissionless) or other suitable content-addressable storage system (WORM drive, or proprietary system).

The business logic layer executes the logic for a contract, which may be facilitated through an execution engine. The execution engine can determine the correct engine extension to use, based on the metadata for the contract. If the business logic for the contract is expressed in a form of legal DSL, then it delegates the call to the virtual machine (e.g. a WebAssembly stack machine). The server, execution engine, and VM may pull data into the execution context via persistence layer service extension points that support basic create/read/update and delete operations on templates, clauses and arbitrary objects (JSON data). Any events emitted by the business logic are preferably then forwarded to the outbound channel tier.

The execution engine may be responsible for managing the contract execution context and chaining the execution of dependent logic clauses within a contract. The results of execution, and the modified context state, are preferably sent to the persistence tier for persistence to ensure deterministic execution, high-availability and recoverability.

The outbound channel (transaction) layer is preferably responsible for secure and reliable communication with external systems. The outbound channel may include retry/backoff logic to deal with external systems that are slow or temporarily unavailable. Any state required is preferably held in the persistence layer. Example outbound channels may include (but are not limited to): HTTP POST, JMS enqueue, SMS send, push notification, API-based event (e.g. payment, API-based, and invocation/execution of a blockchain/distributed ledger operation (e.g. invocation of a on-chain script or data-driven contract).

The system and method may provide a number of potential benefits, in addition to other benefits not provided here.

As one potential benefit, the system and method may enable users (e.g., lawyers, contract managers, and business professionals) to turn traditional, legally binding agreements into executable legal contracts. It may accomplish this through an easy-to-use system for enabling legal contracts to be executed in response to external data and be connected to a wide variety of software systems and platforms, including blockchain and distributed ledgers.

The system and method may provide the potential benefit of mitigating or removing issues relating to the management of contracts using CLM systems. Contract state may be visible to users in real-time or near real-time using the system and method. Using the system and method significantly reduces the need to rely on 'proxy' information about a contract, and the need to manage a contract 'indirectly' as is often the case with CLM systems that manage data about, or extracted from, the contract rather than the contract itself.

As another potential benefit, the system and method may avoid many issues with executing contracts on a BDL, such as improving scalability, improving privacy of computation; facilitating versioning and increasing flexibility/amendment of contract code; improving on-chain security through standardization of code (e.g. via an on-chain library), and more. One particular benefit is that the system may reduce computation costs and increasing on-chain transaction by selectively using BDL systems (or not using a BDL at all). All validating nodes on a BDL or other such network may—as is typically the case—not have to process every transaction as this may occur at least partially 'off-chain'. As such, transaction or computation costs (e.g. 'gas') may be reduced as only the transactions/state that require global state are actually executed or broadcast on-chain. The system and method may also natively use more than one BDL system. These attributes may be achieved by the system and method by avoiding global state transmission for all transactions such that the contract layer (where state may only be shared between the parties and relevant third parties) and transaction layer (where global state consensus may be needed to perform transactions that require transmission to parties other than those to the contract, such as the recording of a transfer of real property—that may be reflected as an on-chain token) are separate.

Furthermore, the system and method may provide executable code to be paired directly with natural language text of a document to provide an executable legal contract. The system and method also enables static natural language contracts to have executable functionality—providing users with real-time state and performing operations on external resources based upon the current state of the contract (e.g., updating the state of an invoice on an accounting system via API). As another potential benefit, the templating functionality may enable lawyers and other business professionals to create and execute contract documents in a manner capable of utilizing blockchains and distributed ledgers in a user-friendlier manner that is more attuned to existing legal practices. For example, a general-purpose blockchain programming language (e.g., Solidity) may not be required at the contract level, and a more appropriate legal domain specific language (DSL) may be used for expressing the legal contract logic. Furthermore, on-chain complexity may be abstracted away through the use of standardized on-chain code that interfaces with the contract, meaning that the user does not need to concern themselves with the programming of blockchains/distributed ledger systems, but only ensuring appropriate actions are taken at the contract level. This has the benefit of separating concerns between the BDL system and operations performed thereon, and the legal contract; both of which may have different administrators, maintainers, and direct users.

As another potential benefit, the system and method may provide legal contract execution that is deterministic, verifiable, and auditable. This is not possible in existing legal contracts. This may be run wholly off-chain (e.g. where it may provide beneficial).

2. System

Figure 10:
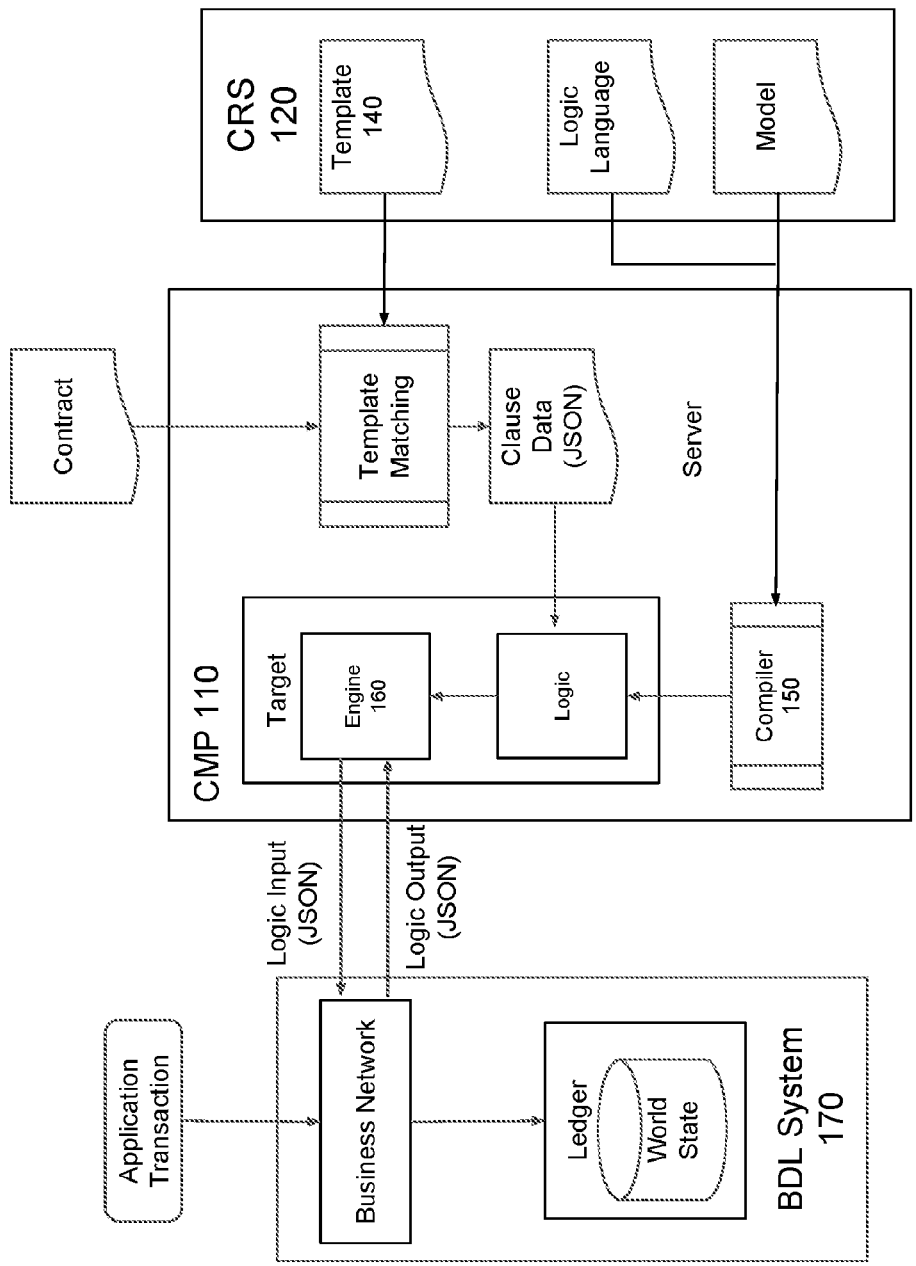
FIG. 10 is a schematic depicting an exemplary implementation of the components of the system and method.
Figure 11:
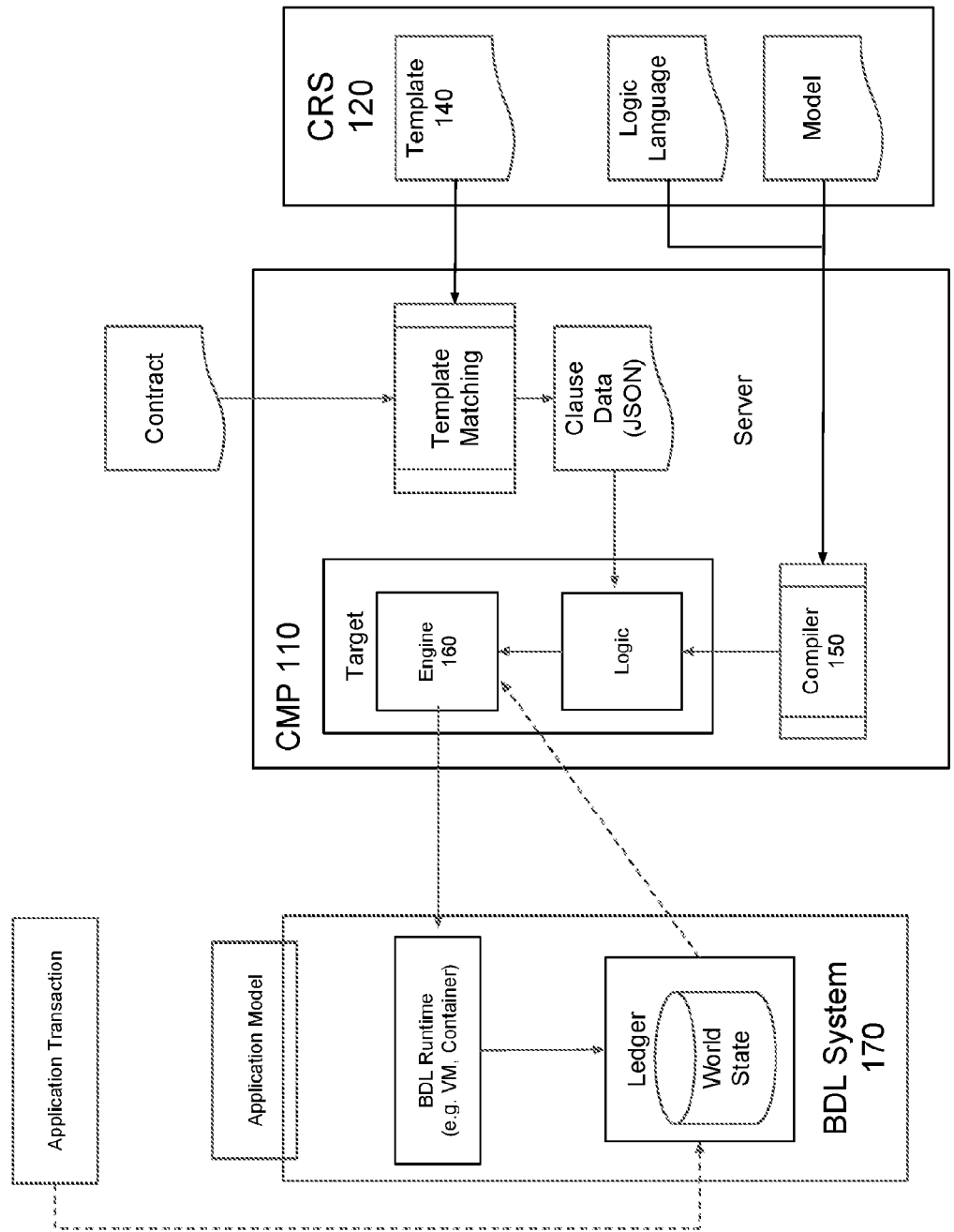
FIG. 11 is a schematic depicting an alternate exemplary implementation of the system and method.
Figure 12:
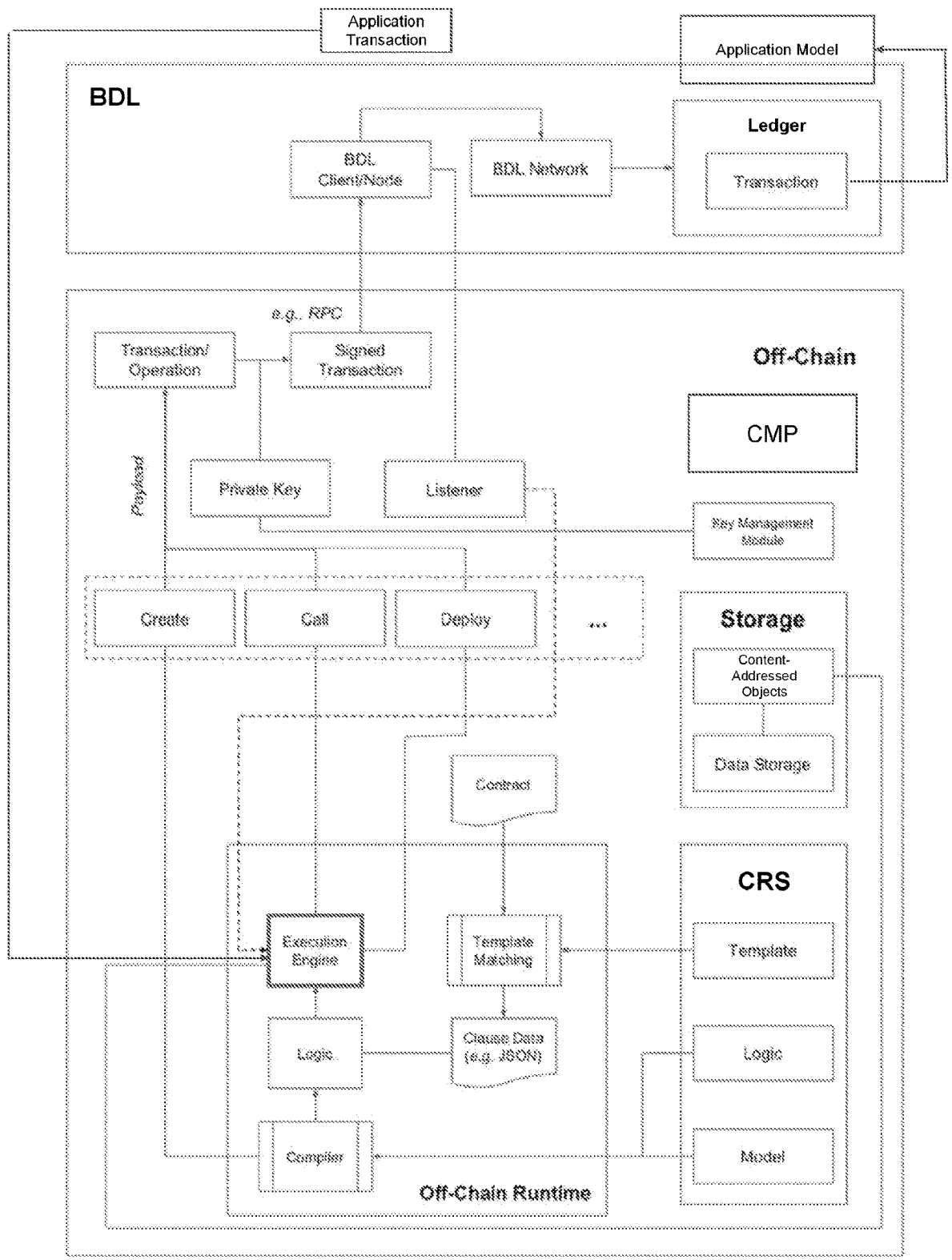
FIG. 12 is a schematic depicting an alternate exemplary implementation of the system and method.

As shown in FIG. 10 a system of preferred embodiment may include contract management platform (CMP) 110, a contract repository system (CRS) 120, a contract state system (CSS) 130, a templating system 140, a compiler 150, an execution engine 160, and a blockchain/distributed ledger (BDL) network 170. The system may function to enable creation and implementation of an data-driven contract in association with a BDL system. The system is preferably used in transitioning a BDL network 170 in accordance with a legal contract as established and managed through the system. The system may function with additional components or fewer components, as desired, or with alternate configurations. For example, FIG. 11 depicts unidirectional interaction of the execution engine with the BDL, and FIG. 12 depicts an example of the system with an alternate configuration of the execution engine that includes private key and listener components for enhanced security. FIGS. 10, 11, and 12 each show one implementation of triggering a transaction on a BDL system and transitioning the network.

Contract Management Platform

The CMP 110 of a preferred embodiment functions to manage a contract. The CMP 110 may be used by a user to edit, negotiate, form, execute, manage, and analyze contracts. A contract may take any suitable form or structure as decided by the contracted parties. Preferably, a contract is composed, at least partially, of machine-readable/computable components. A contract may preferably have a class-like structure with clauses as methods. Contract clauses may be composed of both machine-readable contractual clauses and natural language clauses. Clause logic may be written in an expression language with limited expressiveness, allowing conditional and bounded iteration. Programmable clauses preferably have a well-defined signature (i.e. input and output) that are functions.

A programmable clause preferably functions as the executable clause logic within the contract. A programmable clause may take the form of 'programmable clauses' as outlined in U.S. patent application Ser. No. 15/476,791, filed 31 Mar. 2017.

Figure 5:
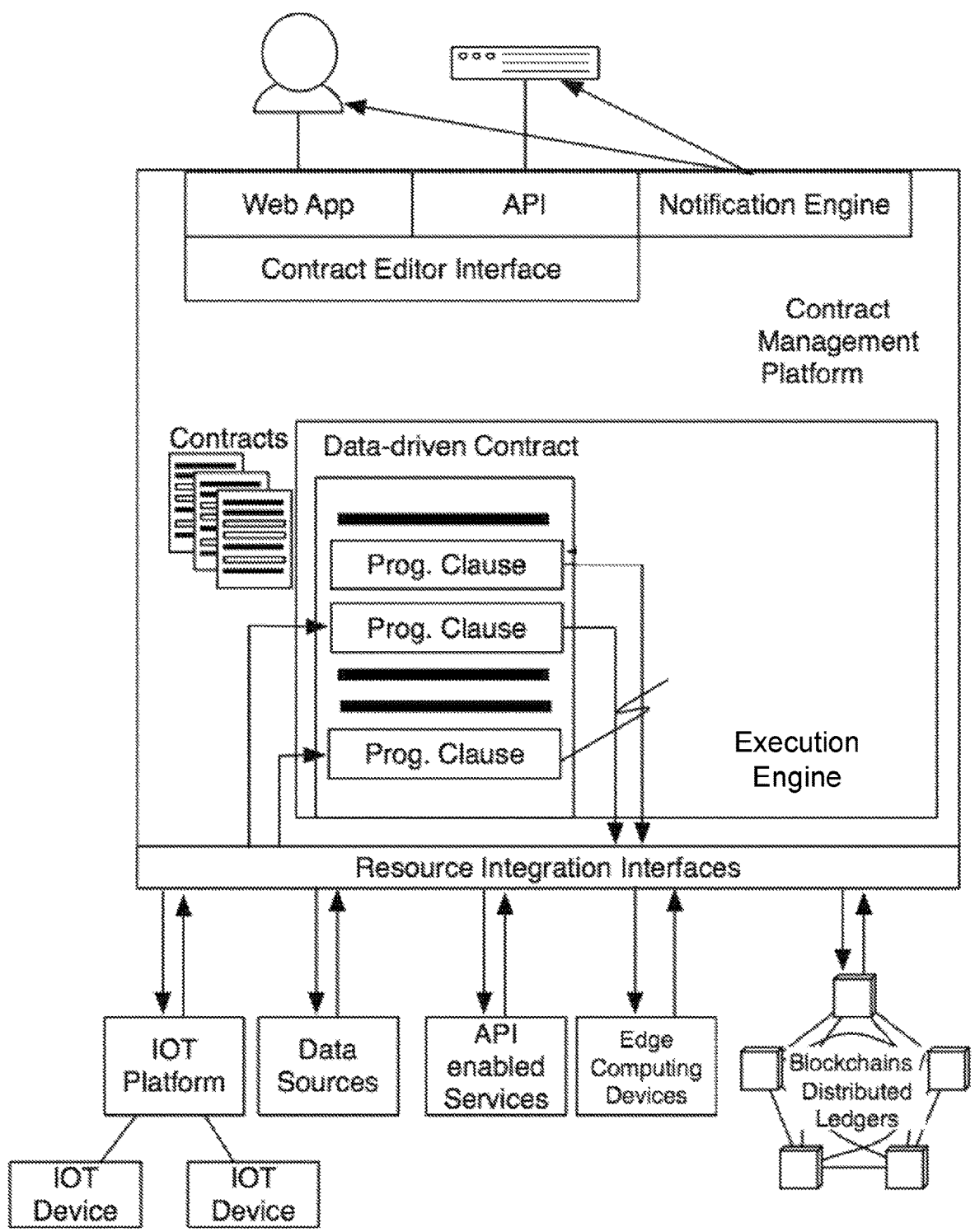
FIG. 5 is a schematic depicting an exemplary structure of an exemplary contract management platform.

The CMP 110 preferably includes (but is not limited to): a contract editor (which may form part of a wider Integrated Development Environment), a template library for both clauses and contracts, and various dashboards for viewing the contract state and contract data (e.g. audit trails), as well as analytics pertaining to contract data and state. A contract may be formed through the CMP 110 using the contract repository system. A contract may be executed in that repository, or using other approaches, by the execution engine 160. The CMP 110 may enable a user to analyze the state of the contract. Data pertaining to the state of a contract may be obtained from the Contract State System, and/or a blockchain/distributed ledger, and/or any other external resource. In a preferred embodiment, the CMP 110 may take a form substantially similar to that outlined in U.S. patent application Ser. No. 15/476,791. FIG. 5 depicts an exemplary form of a CMP 110. However, the CMP 110 may take any suitable form. The CMP 110 may be provided as a cloud-based multi-tenant platform, a desktop client, or by any other suitable means.

Contract Repository System

The CRS 120 of a preferred embodiment functions to store contract related data. Preferably contract related data includes all of the data pertaining to a contract. Contract related data preferably includes, the contract template and logic. An exemplary depiction of the CRS 120 in relation to other components of the system is shown in FIG. 10.

Preferably, the CRS 120 consists of a series of repositories. Each contract may be stored as a repository consisting of a variety of clauses as shown. A repository may be publicly accessible or may be private to a given subset of users. For example, access to the system and a given set of repositories may be conditioned upon a user belonging to a given organization or party to a specific contract. The CRS 120 may function in association with or independently of the CMP 110. The CRS 120 is preferably accessible from the CMP 110. The CRS 120 may be a multi-tenant cloud-based system a locally hosted system, on or as part of a peer-to-peer network (e.g. utilizing a distributed file system such as InterPlanetary File System), or take the form of any suitable data storage system.

Contract State System

The CSS 130 of a preferred embodiment functions to store data pertaining to versions of the state of a contract. The CSS 130 preferably functions in conjunction with the CRS 120. The CSS 130 enables the versioned state of the contract to be stored between the contracting parties in both the pre-formation phase (i.e., prior to execution), such as when a contract is negotiated/edited, and post-formation (i.e., when the state of a contract changes whilst being executed). Each party to a contract may have a copy of a CSS 130 that maintains the contract state.

Figure 9:
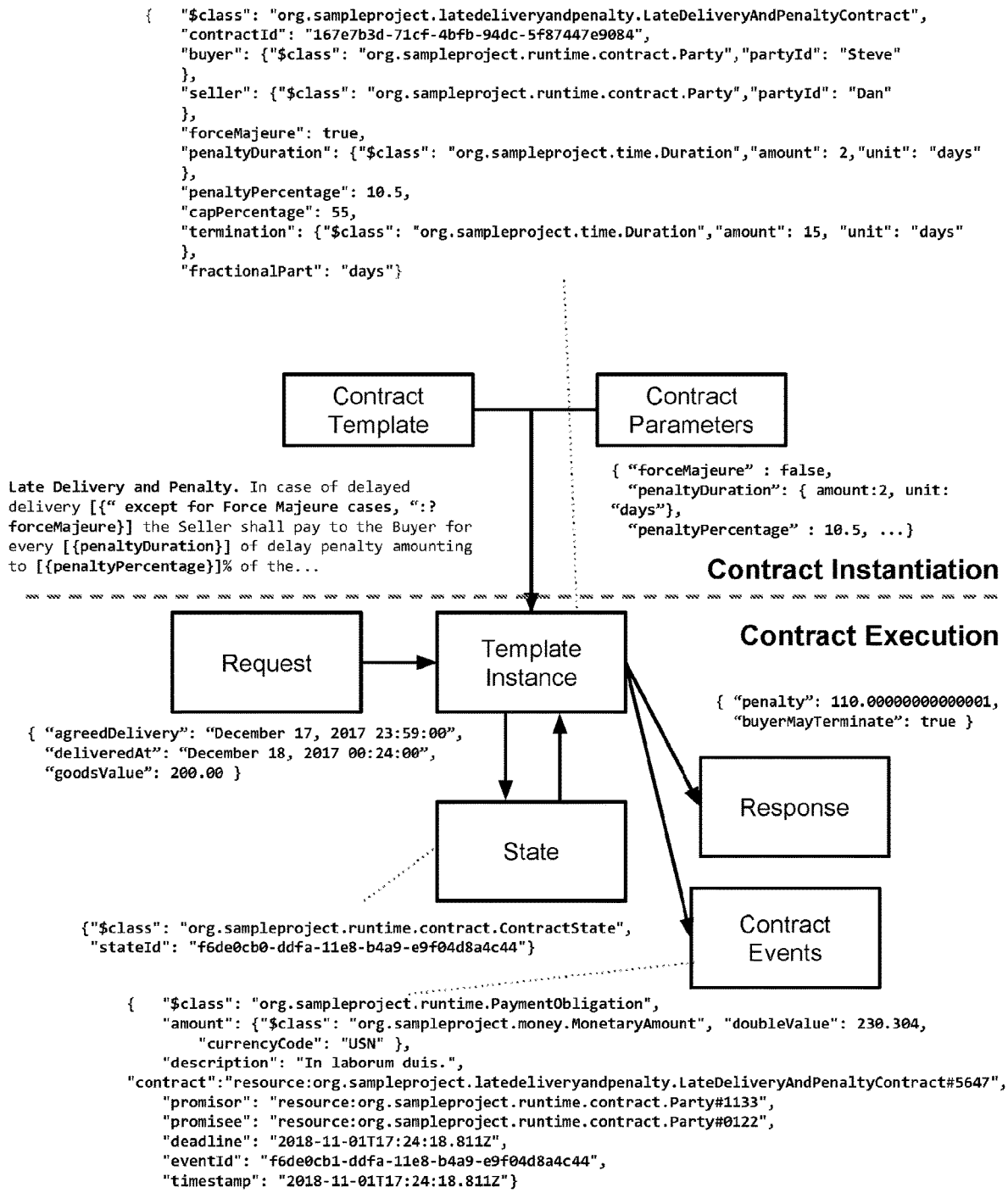
FIG. 9 is a schematic depicting an exemplary template instance, request, response, and emission of events at the execution engine.

The versioned contract state may be kept as an object graph that preferably performs the function of storing contract state through a series of objects in both the pre-formation and execution stages of a contract life cycle. Object examples are depicted in FIGS. 4A-4B and 9. The object graph preferably takes the form of a Merkle directed acyclic graph (DAG) data structure, but may take other forms. Objects may represent any state update, transition, event, operation, and/or contract component. Contract state may be an output from a contract (see FIG. 9), or used as an input to a contract. The CSS 130 may use any suitable backend for persistence of objects (e.g. a distributed file system, database, object store). Other approaches to storage and persistence of contract state data may be used, such as key-value stores, distributed hash tables, distributed file systems, databases, etc.

Objects or other data from the CSS 130 may be pushed on to a BDL 170 as a record of an event occurring (e.g., to share state such as the reference of an object). Contract events emitted from the execution engine may be instantiated on the CSS and/or a BDL as a distributed record. Any suitable event that pertains to the contract may be instantiated. Examples of such events may include (but are not limited to) contract signing, contract edits, executed side effects (such as API triggers e.g., payments, on-chain code execution, etc.), status events (e.g., contract transitions between life-cycle statuses such as a contract being in 'running', 'signing', 'completed', 'terminated' states as shown in FIG. 4B). This data is preferably generated by execution of the logic (either on-chain or off-chain) and operations within the CMP (e.g. signing, changes to clauses, etc.), where applicable.

An object instantiated on-chain may include, for example, a unique identifier, a timestamp, the identifier of the related contract and/or clause, the identifier of the user or system that performed the action (if applicable), data schema declarations and any additional data specific to the type of audit trail object. Additional and/or alternative data may be instantiated. Objects instantiated on a BDL may make use of a BDL script. A BDL-based script may be utilized to instantiate an 'audit log' (see FIGS. 4A and 4B). Such an audit log may be particularly useful for sharing/instantiating events that may not transition the state of the network between participants (e.g., pre-formation/pre-execution events). Such events may also be instantiated on a separate ledger structure, chain, or channel (e.g. one accessible to a different set of participants, solely the contracting parties, non-network participants, etc.) to that used for events that transition the state of the network, as mentioned herein.

Objects or other data may also be used by the contract logic to execute operations, events, execute calls to the on-chain code, or to transition the state of the contract. Other applications of the CSS 130 and CSS data may also be used.

Templating System

The templating system 140 of a preferred embodiment functions to bind natural language text to executable contract logic in a reusable manner. The templating system may provide the technology to formalize a set of legally enforceable executable clauses with a contract. Executable contract logic may be expressed in any general-purpose language, high-level language, low-level language, machine code, bytecode, markup or markdown language, or any other suitable approach or combination of approaches. A domain specific language (DSL) for legal contracts is preferably used, but any suitable language may be used. The templating system may be made of three components: a template grammar, a template model, and a template logic as seen in FIG. 10. The template grammar may consist of natural language contract text that identifies data-oriented variables (e.g. price, date, etc.). The template model may provide a framework for categorizing the variables and the components of the business context that "activate" the contract. In some variations, the template model can mirror or otherwise map to an object model of the BDL network 170. The template's logic may be used to execute the contract once the elements of a legal contract and the business context are categorized with a data-oriented modeling language.

Templates may be for contracts comprising of a single clause or for contracts comprising of multiple clauses. For simplicity, this document will mainly refer to single contract clause templates, but templates may equally function for multi-clause contracts. Templates may support extensible representations of their execution logic. Additionally, a contract may incorporate multiple templates. Many different execution paradigms (e.g., rule-based, logic inference, temporal, finite state machine, functional, etc.) may be used. Templates (with or without executable logic) may be hashed using a cryptographic hashing process and stored in content addressable storage systems as shown in FIG. 7. Templates may support one or more locales, allowing the template to be edited or visualized in different languages, whilst preserving a single locale-neutral executable representation. Templates are preferably stored in the CRS 120. Alternatively or additionally, a package manager, other repository system, or any other database or data storage mechanism may be used. A template may include (but is not limited to): metadata, such as name and version; modeling language models, which define the template model, request, response and any required types; template grammar for each supported locale; a sample instance, used to bootstrap editing, for each supported locale; and executable logic.

Figure 1:
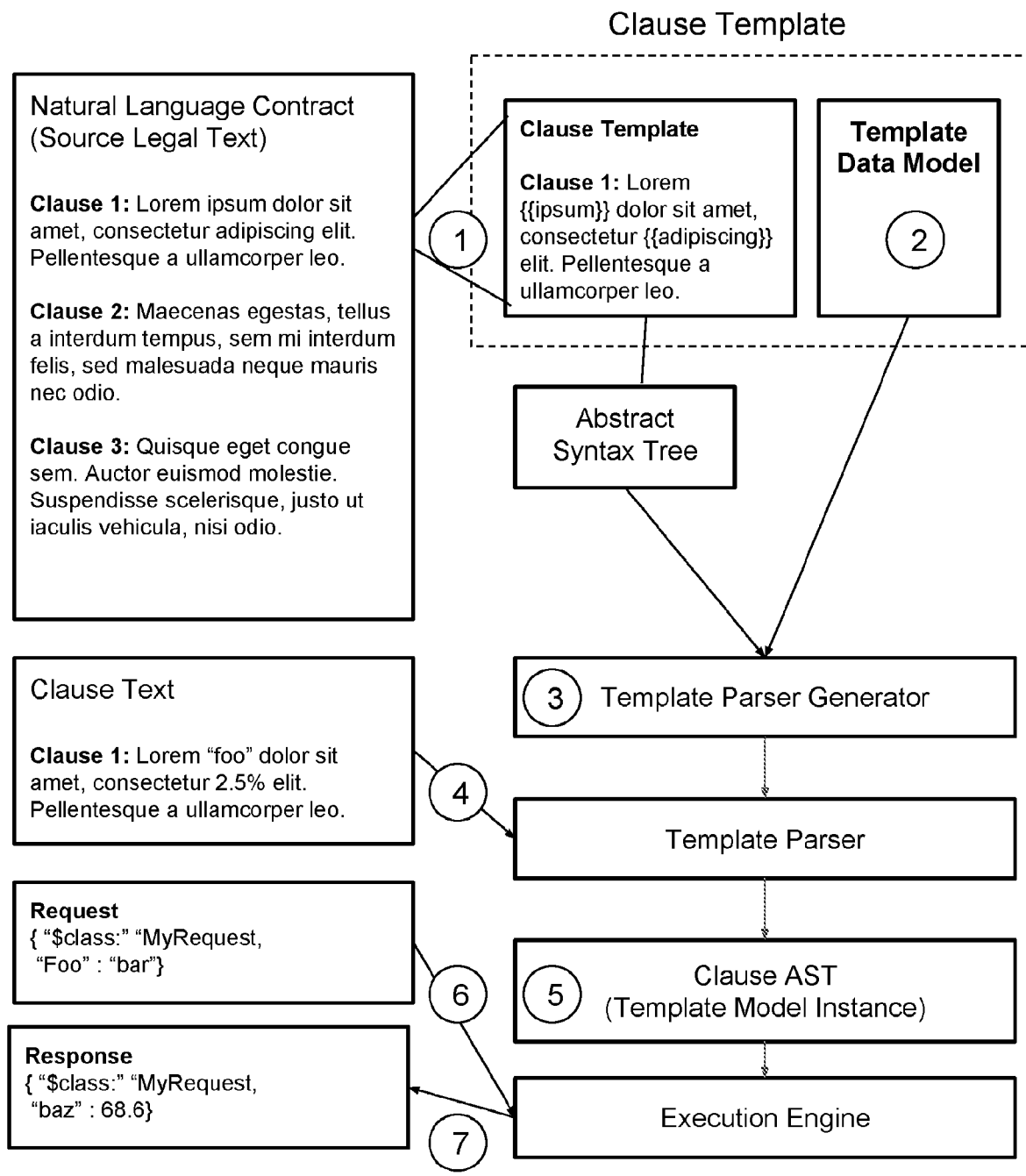
FIG. 1 is a schematic depicting an exemplary structure of a templating system.

FIG. 1 depicts an exemplary high-level structure of a preferred templating system. The following is intended to be indicative of one approach, and non-limiting. Preferably, a templating system 130 will function at a 'clause level', such that a contract may be composed of a variety of swappable, executable, programmable clauses. Clause level functionally may have the potential benefit of enabling executable programmable clauses to be embedded in, instantiated in, or added to, natural language contract documents, rather than requiring a new template. As such, the following shall refer to templating systems for single programmable clauses, but may equally apply to any other form of templating system (e.g., multiple clauses, whole contracts, etc.). A templating system for a programmable clause is preferably comprised of annotated legal text and accompanying template model that defines the assets, participants, concepts and events that are relevant to the programmable clause. The execution logic for the programmable clause is preferably in a legal contract Domain Specific Language (DSL), (FIG. 1 (1)). Variables and expressions in a template are preferably expressed in terms of a typed data model that captures all the concepts of relevance to the clause. The template model technology allows importing concepts from namespaces, allowing concepts to be shared across templating systems (FIG. 1 (2)).

Templating System: Packaging

A template may be packaged as a set of components, which may be stored in a CRS filesystem or similar. An exemplary set of components that may define a template can be:

metadata, such as template name and version;
 models, which define the template model, any required types, and may also include any request and response events;
 template grammar for each supported locale;
 a sample instance, used to bootstrap editing, for each supported locale; and
 executable logic.

Templates may be packaged and distributed as zip archives or other suitable packaged formats, or read from: a directory, a source code repository, repository files system (e.g. CRS), a package manager, or any other suitable means. Each of these distribution mechanisms may support slightly different use cases. A directory-based package may be useful during testing, and may allow changes to the template to be quickly tested with no need to re-package. A source code repository package may allow templates to be distributed and versioned as publicly or privately accessible libraries. A package manager version may allow dependencies on templates to be easily declared for Node.js and browser-based applications, and it may integrates with CI/CD tools.

Template Packaging: Metadata

The metadata for a template is preferably stored in a text file (e.g., '/package.json').

The name property preferably consists of a naming pattern following a pattern such as [a-z][A-Z][.]. It is preferred that the name be prefixed with the domain name of the author of the clause, to minimize naming collisions. The version property can be a semantic version of the form major.minor.micro using a naming pattern such as [0-9].[0-9].[0.9]. This data format ensures that a template can be published to the npm package manager for either global or private (enterprise-wide) distribution.

Alternative and/or additional properties such as 'locales' and 'jurisdictions' may be added as future.

Template Packaging: Markdown File

The root of the template may also contain a markdown file or other suitable type of documentation file to explain the purpose and semantics of the template. This file may be displayed by tools to preview the template or provide usage instructions.

Template Packaging: Template Grammar

The template grammar files for the natural language used by the template may be stored in the '/grammar/' folder. Any grammar files placed directly within the 'grammar/' folder may be considered to be locale neutral and can be used if the user does not specify a locale.

Locale specific grammars (for templates that support multiple locales) should be organized by locale, hence a grammar for the English locale should preferably be placed in '/grammar/en' while a grammar file for the French locale should be placed in '/grammar/fr'.

The locale folder may optionally contain a configuration file (e.g., 'config.json') that describes the template in the language of the locale. If no such file is present then the description of the template is preferably read from the description property of the metadata file.

Template Packaging: Template Model

The template model for a clause is preferably stored in a set of files under a '/model' folder or similar. The template model files should preferably be in the format defined by the modeling language. All template models for the template are in-scope and types from all namespaces may be imported as shown in the import statements of FIG. 16.

Templating System: Executable Logic

The executable logic for a clause is preferably stored under a logic folder (e.g. '/lib'). The folder may also contain a configuration file (e.g., 'config.json') that specifies the language and options used to express the executable logic. The file may also contain other options specific to the execution of the logic.

An execute command may be used to load a template from a directory on disk, instantiate a clause based on input text, and then invoke the clause using an incoming payload (e.g., JSON request payload).

Templating System: Parsing

The template model is preferably a component of the templating system. The template model for a programmable clause comprises of the data elements of the programmable clause such as in example FIG. 27H. The template model may function to define formal semantics for the programmable clause. The template model preferably defines the data in a region neutral representation that the template requires. The template model may also enable powerful search, filtering and organization of templates. For example, by the template model may enable finding all templates related to a concept X, or all templates that can process a transaction of type Y.

The template model preferably captures a machine-readable (and hashable) representation of the executable data extracted from the programmable clause (FIG. 1 (5)). The template model may be captured using any appropriate modeling language. Preferably, the modeling language takes the form of a lightweight schema language (e.g., Hyperledger Composer Modeling Language (CML) format) that defines namespaces, types and relationships between types. The modeling language preferably includes first-class support for modeling model objects such as participants (individuals or companies), assets, transactions, enumerations, concepts, events, obligations, legal interests, and/or other suitable object types. The modeling language may include various features of an object oriented modeling language, including inheritance, meta-annotations (decorators), and field specific validators. The members of the modeling language, e.g. contracts, programmable clauses, expressions, operators, may preferably be in a region-neutral, context-free grammar form (e.g., Backus-Naur form). In addition, the language may include formal semantics defining transitions from the contract state input to the contract state output. The language may also define serialization of instances (e.g., to JSON), and validation of instances (e.g., making it easy to integrate with a wide variety of JSON capable external systems).

Template models may be packaged for distribution (e.g., as npm modules or any suitable format). The template models can declare dependencies on other template models, reducing the technical barrier to entry to creating an ecosystem of mutually reinforcing industry standard models. Other approaches, features, characteristics, support, technologies, data models, bindings, formats, and the like may be used.

In an example modeling language, the template model may look like FIG. 16. The template model for the programmable clause captures unambiguously the data types defined by the programmable clause. In this example, the "Duration" data type is imported from a namespace, which defines a library of useful reusable basic types for contracts (e.g. 'time' concepts as shown in FIG. 16). In the example, the @Template decorators are used to bind the concept to the programmable clause. In such an exemplary implementation, a single concept within the model files for the template may have the @Template decorator.

At least two types of variable definitions may be supported by the templating system 140: Boolean bindings, that may set a Boolean property in the template model based on the presence of text in the contract clause; and Binding, that may set a property in the model based on a value supplied in the contract clause. Variable types are preferably extensible and upgradable such that other types of bindings may be used. Any variable types within the template model may have an associated template grammar file. For example, the "Duration" type may have a template grammar that captures the syntax for how to enter calendar durations in English, French, etc. These dependent template grammars are preferably merged into the template grammar for the root type for the template (the type with the @Template decorator).

The template grammar is preferably a component of the templating system 140. The template grammar functions to make a contract clause executable by relating the template model for the associated programmable clause to the natural language text that describes the legally enforceable clause. The template grammar for a contract clause may thus comprise of the natural language for the contract clause with bindings to the template model using markup language. In this manner, the template grammar may determine what a syntactically valid contract clause can look like. A markup language may be of any arbitrary complexity.

A parser is preferably a component of the templating system 140. The parser may function to generate an instantiation of the contract clause as shown in FIG. 26. A parse command may be used to load a template from a directory on disk and then use it to parse input text, echoing the result of parsing. If the input text is valid the parsing result can be a JSON serialized instance of the template model. The instantiation of a contract clause generated by the parser may be automatically generated from the template grammar and/or template model associated with the contract clause. The parser process may be completely automatic and may support customization of types and nested grammars (FIG. 1 (3)). Language specification may be inherent to the templating system 140. The generated output of the parser may now be used to dynamically edit and validate source programmable clause text (potentially using code completion, error reporting, etc.). The editor may be embedded on a webpage, provided as a SaaS service, run within an Integrated Development Environment (IDE), or any other appropriate form factor (FIG. 1 (4)).

The output of the template parser is an instance of a template model (FIG. 1 (5)). For example, the output of the template parser could be a JSON abstract syntax tree that may be deployed to the execution engine 160 (FIGS. 1 (6)-1 (7)). Alternatively, any suitable approach may be taken and any appropriate technology may be used.

An example of the templating system may be provided by a late delivery and penalty contract clause, as shown in FIGS. 17A-17C. FIG. 17A shows template model that contains the data elements (i.e. variables) for the contract clause and the data types, which may include basic and high-level data types (e.g. Boolean, double, Duration). The data elements captured by this exemplary clause are: whether the clause includes a force majeure provision; temporal duration for the penalty provision; percentage for the penalty provision; maximum penalty percentage (cap); and Temporal duration after which the buyer may terminate the contract.

The Duration data type is higher-level data type, preferably imported from a namespace, which defines a library of useful reusable basic types for contracts. The @Template decorators may be used to bind the modeling language concept to the contract clauses.

FIG. 17B shows the template grammar for the aforementioned late delivery example. As shown, the exemplary markup grammar contains variables, wherein each variable is embedded in a pair of hyphens and brackets: "[{variable]}". Any suitable markup convention may be used to define a variable.

[{"except for Force Majeure cases,":? forceMajeure}]: this variable definition is a Boolean assignment. It states that if the optional text "except for Force Majeure cases," is present in the clause, then the Boolean forceMajeure property on the template model should be set to true. Otherwise the property will be set to false.

[{penaltyDuration}]: this variable definition is a binding. It states that the variable is bound to the penaltyDuration property in the template model. Implicitly it also states that the variable is of type Duration because that is the type of penaltyDuration in the model.

[{penaltyPercentage}]: another variable binding, this time to the penaltyPercentage property in the model.

[{fractionalPart}]: another variable binding, this time to the fractionalPart property in the model. As this occurs twice in the template grammar, an editor of a preferred embodiment should auto-replace all occurrences.

[{capPercentage}]: this is a binding, setting the capPercentage property on the template model.

[{termination}]: this is a binding, setting the termination property on the template model.

Any types within the template model may have an associated template grammar file. For example the Duration type may have a template grammar that captures the syntax for how to enter calendar durations in English, French etc. These dependent grammars are merged into the template grammar for the root type for the template (the type with the @Template decorator).

The template grammar and the template model are processed by the parser, creating a syntactically valid instance of the contract clause, and thus a legally valid, executable, contract clause as shown in FIG. 17C. The parameters to the contract clause are highlighted in bold.

Template Request and Response

Figure 8:
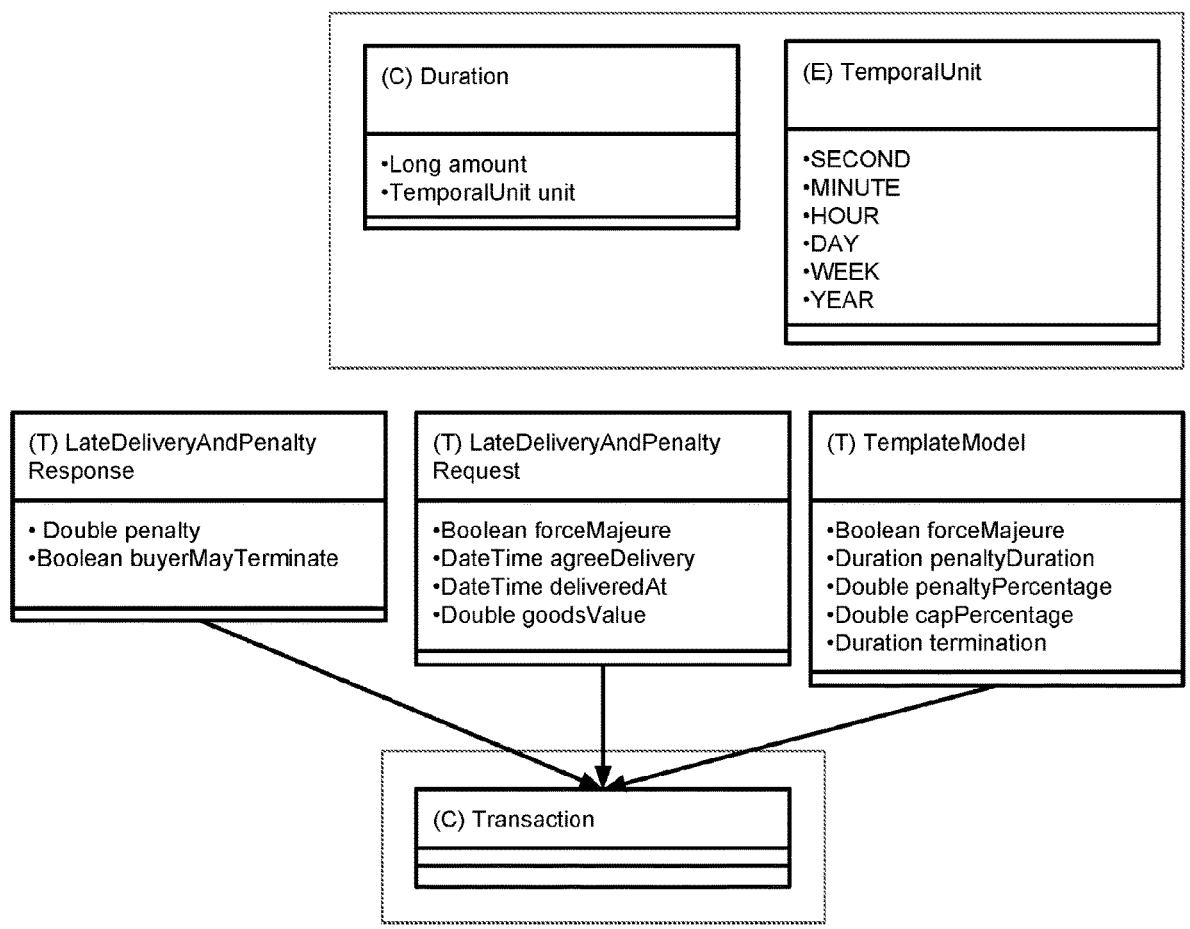
FIG. 8 is an exemplary visualization of a model, request, and response types for a template's interface to an external resource.

Events from external resources (e.g., freight being shipped, delivered, signed-for etc.) may be exposed to the contract. Those transactions may be routed to the template so that the template can take appropriate action. In this example, the action is to calculate the penalty amount, if delivery is late, and signal whether the buyer may terminate the contract. Each template may be invoked as a stateless request/response function. The template's interface to the external resources may therefore occur through a request type and a response type. In other words, establishing a programmable clause through a template can create an API endpoint, which may be used in transitioning state of the contract or performing other interactions with the contract. These API endpoints may be used to deliver input or output to a BDL or other suitable resources. Other approaches may be used. FIG. 8 depicts an exemplary visualization of the template model, along with request, and response types. A Template Request transaction defines the data that the template needs to receive from the outside world. The Template Response transaction defines the data that the template will return when it receives a Template Request.

Example Request: An example request is shown in FIG. 18A. The structure of the data that the template requires from the outside world. This may also be specified in a modeling language or using any other alternative approach. Given an instance of lateDeliveryAndPenaltyRequesf the contract clause can calculate the current penalty amount and whether the buyer may terminate.

Example Response: The structure of the template's response, again using the modeling language, may be captured as shown in FIG. 18B. Execution of the template produces an instance of 'LateDeliveryAndPenaltyResponse'. The contract clause operates as a function with the signature: 'LateDeliveryAndPenaltyResponse myClause (TemplateModel, LateDeliveryAndPenaltyRequest)'.

A template request may be used as a transaction defining the data that the template receives from external resources. The template response transaction defines the data that the template can return when it receives a template request as seen in FIGS. 1(6) and 1(7).

Example Template Logic: FIG. 24 illustrates using a function to implement the template logic. The standard @param and annotations are used to bind the function to the incoming request and response types, while the '@ClauseLogic' annotation indicates to the execution engine this function is a request processor.

The context object passed to the execute method encapsulates the request, response and contract clause data. FIG. 9 represents an exemplary schematic of an exemplary implementation of the execution engine acting upon incoming requests to the logic of a contract template instance, executing the functions of the contract logic, emitting a response, updating contract state, and emitting events/obligations back to the caller. Context may be extended to support extension points for access to historical transactions for the contract clause as well as identity related information. In the above example, the execution engine 160 also places a logger object into scope allowing the contract clause to log debug, log information, and log warning or error messages.

The results of execution (e.g. the execution of a JSON serialized object) may include, but are not limited to: outputting/logging details of the clause executed (name, version, SHA256 hash of clause data); generating an incoming request object; and generating an output response object. One example can be seen in FIG. 25. State may be maintained at a contract level by optionally attaching a contract to a state object as shown in FIG. 9, giving the logic of the contract read and write access to the contract state. Additional and/or alternative data, objects, and metadata may be included.

Contract execution may also emit event objects in addition to a response object. These objects may be emitted to a BDL and/or stored on a CSS. For example, a contract may emit a payment obligation object which can be mapped to on-chain BDL script function calls (e.g. to transition the state of the network). Such objects may also be modelled in a similar manner to requests and responses, as shown in FIG. 9.

Compiler

Figure 14:
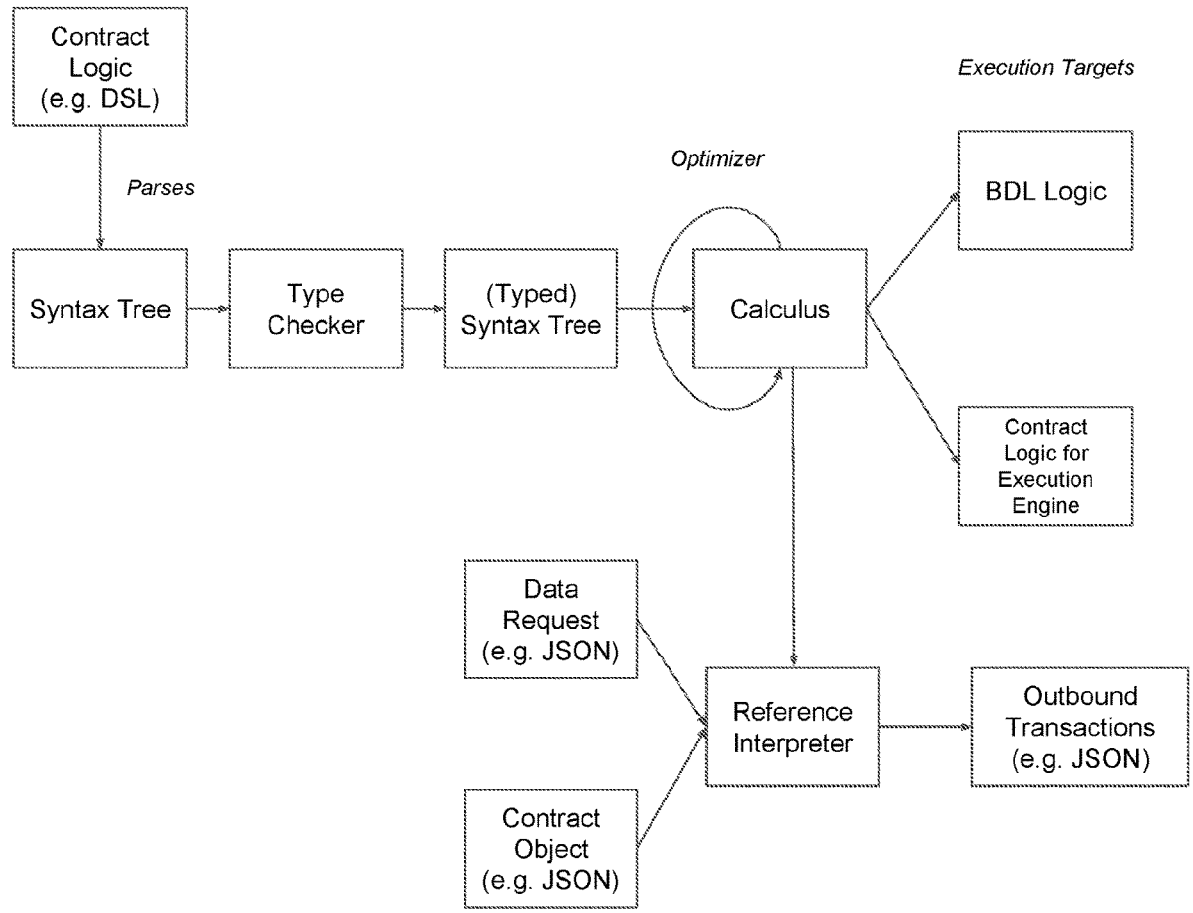
FIG. 14 is a schematic of an example compiler architecture.
Figure 15:
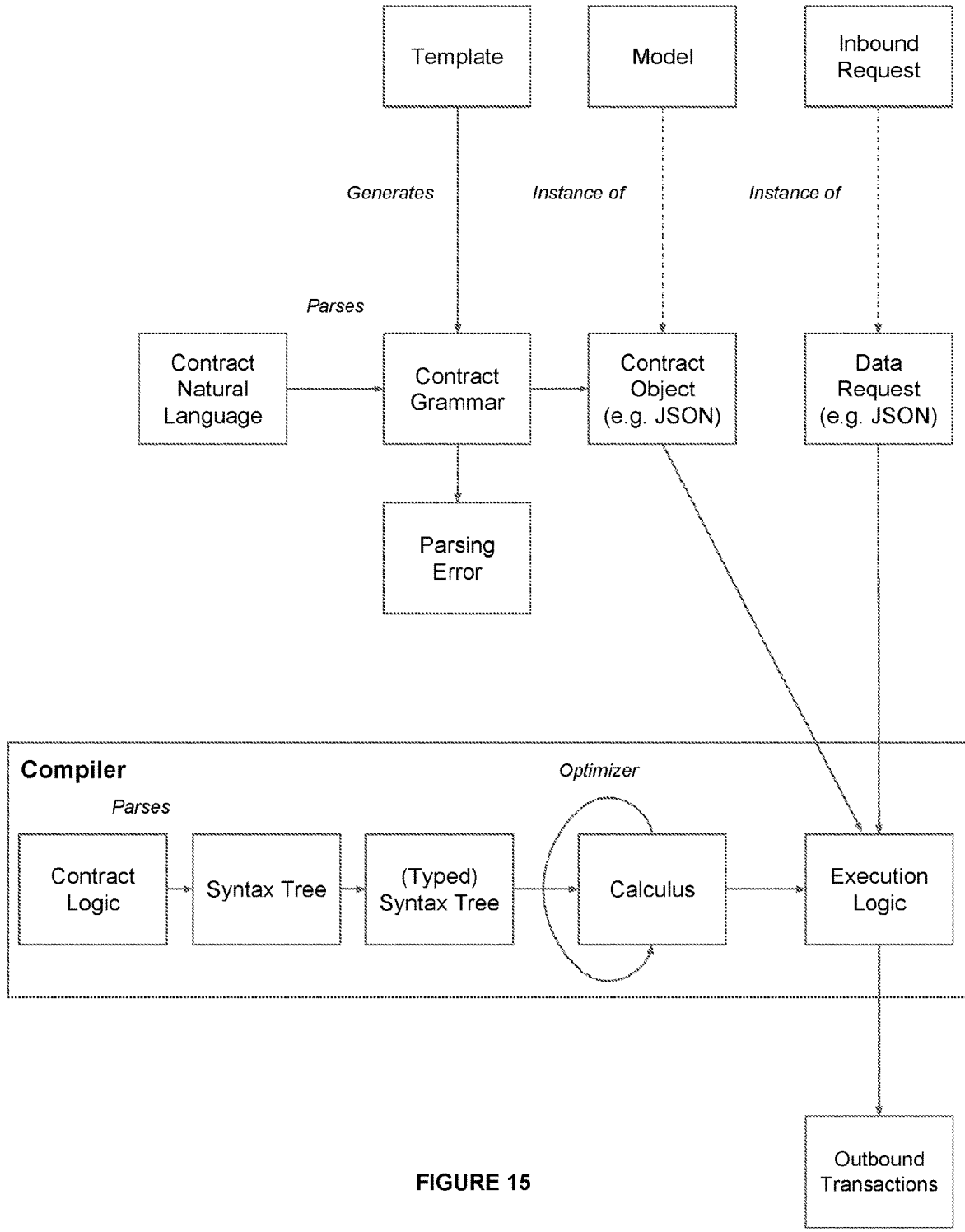
FIG. 15 is a schematic of an example showing how the compiler may be imbedded in the system.

A compiler 150 of preferred embodiment functions to generate code from the contract logic for execution. Prior to execution, a compiler 150 may generate code for execution from the template, using the contract logic (see FIGS. 14 and 15). The contract logic may be in any suitable language, as aforementioned, but may be a domain specific language for legal contracts (e.g. a programming or markup language). The generated code for execution may be for any variety of suitable platforms (e.g. BDL 170). The compiler 150 may include, but is not limited to:

A parser from the contract logic syntax tree to executable syntax tree;

A type checker, that checks the validity of the programmable clause logic against the model and checks the validity of the contract against grammar and typing rules;

A translation from contract logic syntax tree to calculus (i.e. optimizer), that "de-sugars" syntactic sugar to improve code-generation from a simpler calculus; and A code-generator from calculus to a target language.

A compiler 150 may take any suitable form. The compiler 150 may also included target-specific runtime libraries (e.g. JavaScript operation to create a new contract). In addition, user-level standard libraries, for core operations (e.g. math libraries) may also be included. Preferably, the compiler 150 supports formal verification. A reference interpreter can be called from the compiler 150 to get expected behavior. Compiled code may be executed and checked against a reference interpreter. The compiler 150 may also cross-compile to generate executable code for any other platform (e.g., a given BDL system, virtual machine, a microcontroller of a resource constrained device such as an IoT device, etc.). For example, a compiler 150 in the system and method may generate binary code/bytecode for a BDL smart contract system. A compiler 150 in a given embodiment may also take the form of a source-to-source compiler 150.

Execution Engine

Figure 19:
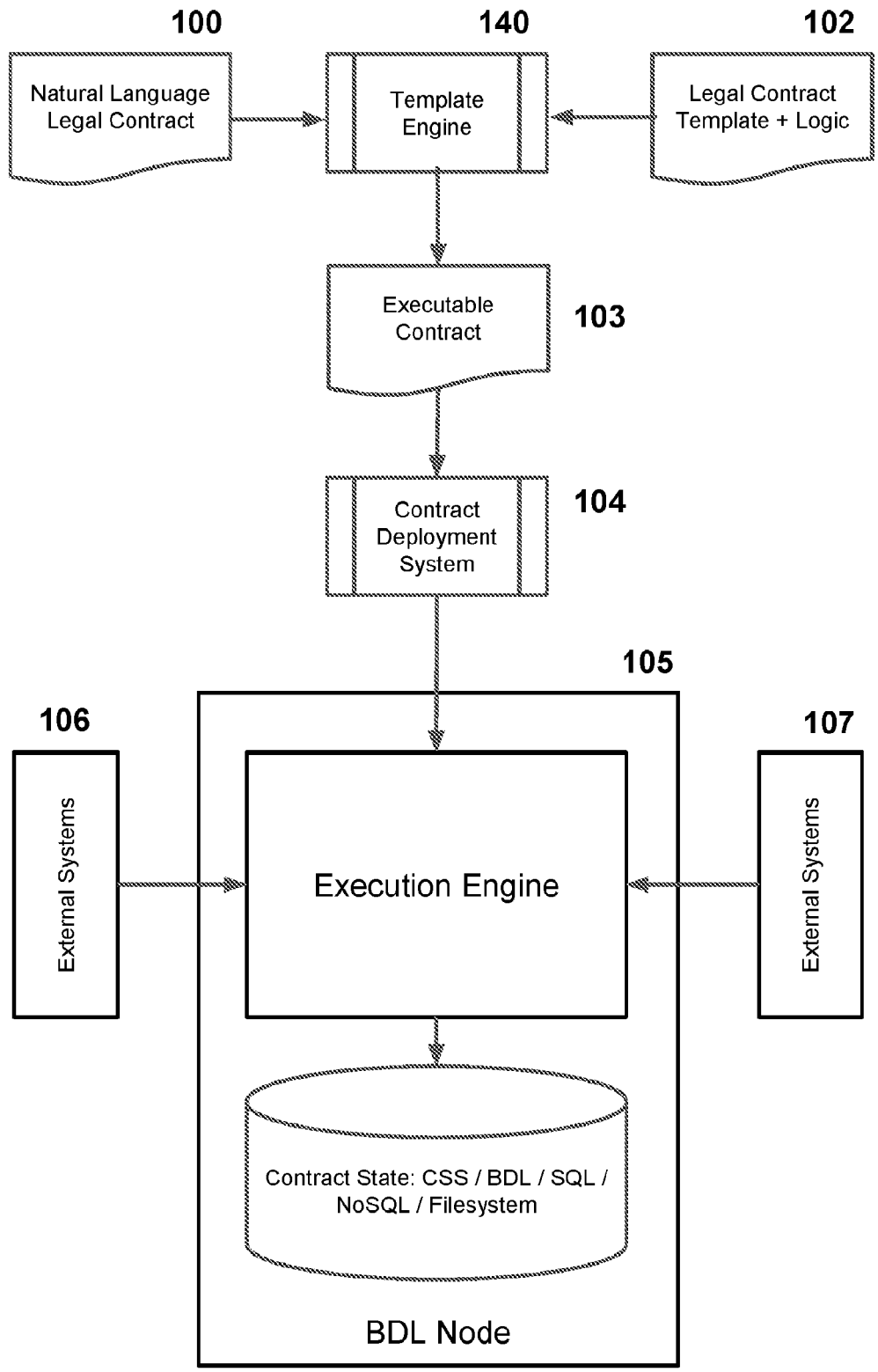
FIG. 19 is a schematic depicting an implementation of a contract being executed on a node of a distributed ledger system.

The execution engine 160 of a preferred embodiment functions to execute the contract. The execution engine 160 may be designed to be embeddable across a wide-variety of form factors: web, middleware, SaaS, on-chain execution, off-chain execution, or any other suitable runtime environment may be used (as per U.S. patent application Ser. No. 15/476,791). As shown in FIG. 19, the execution engine 160 may be embedded within a node on a BDL system. A node on a BDL system is a device on a blockchain network which preferably serves to process an individual copy of the blockchain. The BDL nodes can maintain world state across participants and facilitate consensus. The execution engine 160 may take any suitable form of computing/runtime environment for executing contracts. In one embodiment, the execution engine 160 may take the form of a virtual machine.

In one exemplary implementation, as shown in FIG. 19, an executable data-driven contract 103 can be deployed to a BDL node 105. In this example, a templating engine 101 incorporates the natural language contract 100 along with the contract template model and contract logic 102. The templating system 140 generates an executable contract 103. The templating system 140 generates an executable contract for a variety of target environments. The contract deployment system 104 takes the executable contract 103 and deploys it to the execution engine runtime of a BDL node 105 where it can receive external system events 106 and send out events 107 to external systems. Events can come in the form of any internet application level protocol including, but not limited to, HTTP, MQTT, and XMPP.

The execution engine 160 may handle a variety of input types such as data input accessed over a programmatic interface (e.g., a REST API, GraphQL API, SOAP API, etc.), simple mathematical transformations of the data from those APIs, event notifications, data from various blockchain/distributed ledgers, data from the execution of the contract off-chain or on-chain, and/or other various sources.

In one embodiment, the execution engine 160 may operate as a computing environment that can operate upon content-addressed Merkle objects, such as the CSS 130. This may, for example, include using CSS objects as data inputs, computing new state based upon the objects, and outputting data to the CSS 130 as new objects. Data inputs may be stored on the CSS 130 or may be obtained from any other appropriate external resource. By operating on a data structure like the CSS 130, this may ensure that actions by the computing environment can be deterministic, reproduced, and verified. The execution is preferably deterministic such that the same set of inputs results in the same set of outputs. The actions of the computing environment may be verified against the data and logic storage system of the system and method. The execution history can be stored in an immutable, non-repudiable manner to enable such verification. The input data, output data/external actions, and logic are preferably managed by the execution engine 160 such that prior actions performed by the computing environment can be verified. Alternative approaches may be used. Not all blocks or steps may be used in a given embodiment, and alternative and/or additional blocks or steps may be used.

Figure 3:
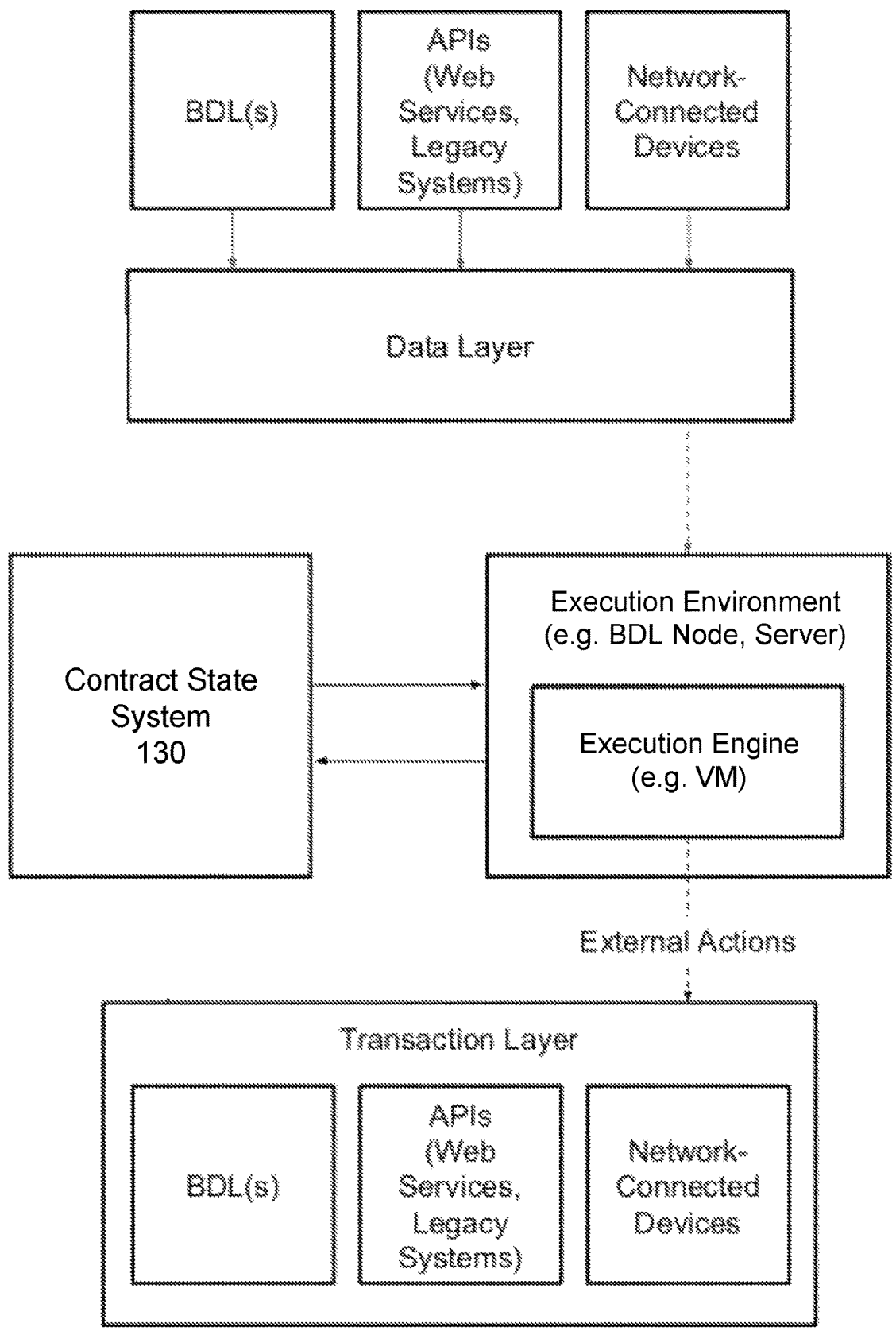
FIG. 3 is a schematic depicting an exemplary structure and interaction between an execution engine, contract state storage system, and external input and output resources.

The execution engine 160 may be run in a shared execution environment such as public, dedicated, or private cloud environment, on a shared server, on a peer-to-peer network, or other appropriate execution environment. This may provide various scalability and privacy benefits over native BDL-based on-chain execution, as well as ancillary practical benefits such as enabling parties to easily calculate and share execution costs (e.g. using data usage-based pricing). FIG. 3 depicts an example of the potential interactions between the execution engine 160 and other elements of the system and method.

The computing environment may be usable for both on-chain and/or 'off-chain' related applications. Here on-chain can refer to transactions, smart contract code, chain code or executable scripts of a BDL system, objects (e.g. from the contract logic, CSS 130, etc.), or otherwise to data added to a blockchain or distributed ledger data structure. Off-chain can refer to computing interactions not on a BDL or those that do not otherwise pertain to a BDL. The term on-chain is not limited to blockchain implementations, but is intended to refer to all forms of blockchain, distributed ledger, and related or similar implementations or embodiments. In some instances, the system and method may support the integration of off-chain systems with on-chain systems. Furthermore, the system and method can act as a computing environment capable of bridging distinct systems whether on-chain or off-chain. For example, a contract may be executed 'off-chain' without a number of the associated drawbacks (e.g., privacy of execution and network scalability), as well as integration with on-chain system components (e.g., a distributed ledger or similar data structure). The interaction may be with one or more BDLs, and may occur through a variety of different approaches (see U.S. patent application Ser. No. 15/476,791). For example, an off-chain execution engine may interact with the runtime of a BDL system by calling, deploying, invoking or otherwise interacting with on-chain scripts, code, and other components instantiated upon, or comprising, a BDL system. The interaction may also make use of the CSS 130. For example, the state of a contract may be stored on the CSS 130 which may then subsequently be used on one or more BDLs.

The execution engine 160 may be a virtual machine (VM) or may form part of one. A virtual machine may be web-based, cloud-based, run on a cluster, or in any other suitable environment. In some implementations, the system and method may be implemented through a distributed peer-to-peer system. Peers may be contracting parties with some interest or involvement in the contract execution, other parties, other computing systems, and/or any suitable entity that participates in the collaborative execution of the system and method. In another implementation, the system and method may be implemented within a private computing system or other suitable computing architecture, such as a cloud-based environment. The VM can be stack based, register based, a business rules engine, a program interpreter, or any other suitable type of virtual machine. In one particular embodiment, the VM may be 'off-chain'. An 'off-chain' VM may have a number of advantages as compared to on-chain VMs. An off-chain VM may interact with the on-chain runtime of a BDL system by calling, deploying, invoking or otherwise interacting with on-chain scripts and other components instantiated upon, or comprising, a BDL system. A VM may be launched from an image for each contract. An image may be launched from the CMP 110. Alternatively, a VM may run multiple contracts.

Blockchain/Distributed Ledger Network

The blockchain/distributed ledger (BDL) component of a preferred embodiment functions as an all-purpose platform(s) that may be used for data exchange, contract storage and contract execution. All, some, or none of these operations may occur on the BDL component. Any suitable blockchain or distributed ledger system may be used. More than one BDL network or data structure may be used in any given implementation of the system. Transactions may be performed on a BDL. A transaction may include any suitable operation performed at least partially on-chain.

A contract may use a BDL in a variety of ways which may include (but are not limited to):

Pushing data from a content-addressed storage (e.g., CSS) to a BDL (e.g., an object on a BDL to reflect a contract event/state as in FIGS. 4A and 4B, passing data to on-chain code to execute a transaction, etc.);

Calling on-chain scripts (e.g., from an on-chain library);

Instantiating code on-chain or compiling to the bytecode of a BDL system for execution on-chain; and Interacting with on-chain code to perform transactions (e.g. FIGS. 10, 11, 12 and 13), where on-chain code can provide any arbitrary functionality.

Calling on-chain code may assist in standardizing on-chain transactions (e.g. on-chain digital asset transfers, escrow, etc) and operations. An on-chain library may consist of standard scripts/functions to perform any on-chain operation. Operations or transactions may have legal implications (such as a transfer of an interest in a digital asset) or otherwise.

Separating the contract computation and the transactional effects of contract computation enable on-chain operations to re-use scripts with attendant benefits for security, predictability of behavior, ease of development, and similar.

As per U.S. patent application Ser. No. 15/476,791, contracts may use BDL in the aforementioned approaches, using additional approaches, and/or using alternative approaches. In one variation, as depicted in FIG. 10, a BDL system may be composed of a business logic layer in addition to a persistence layer.

Figure 6:
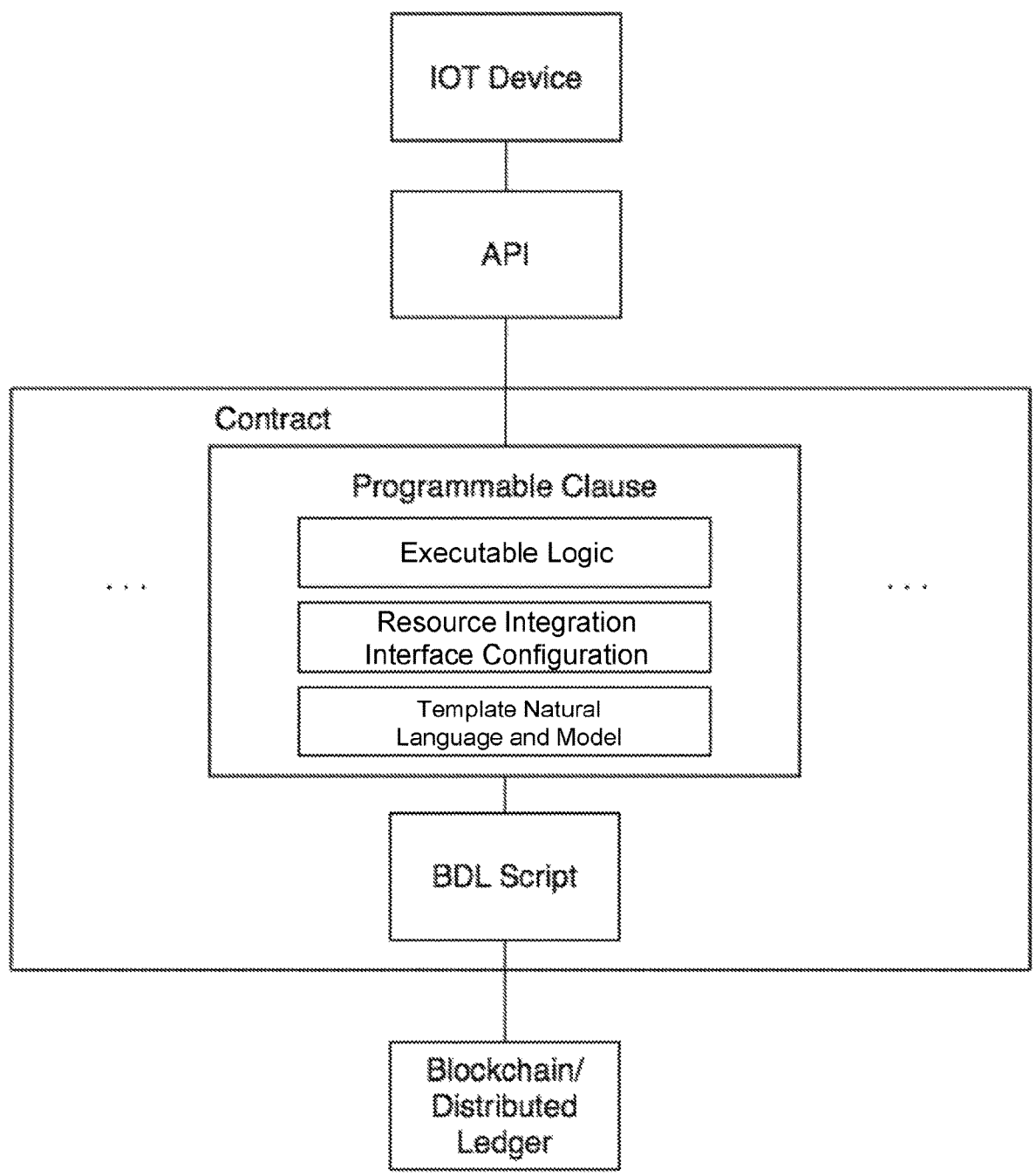
FIG. 6 is a schematic depicting an exemplary structure of a clause within a contract.
Figure 13:
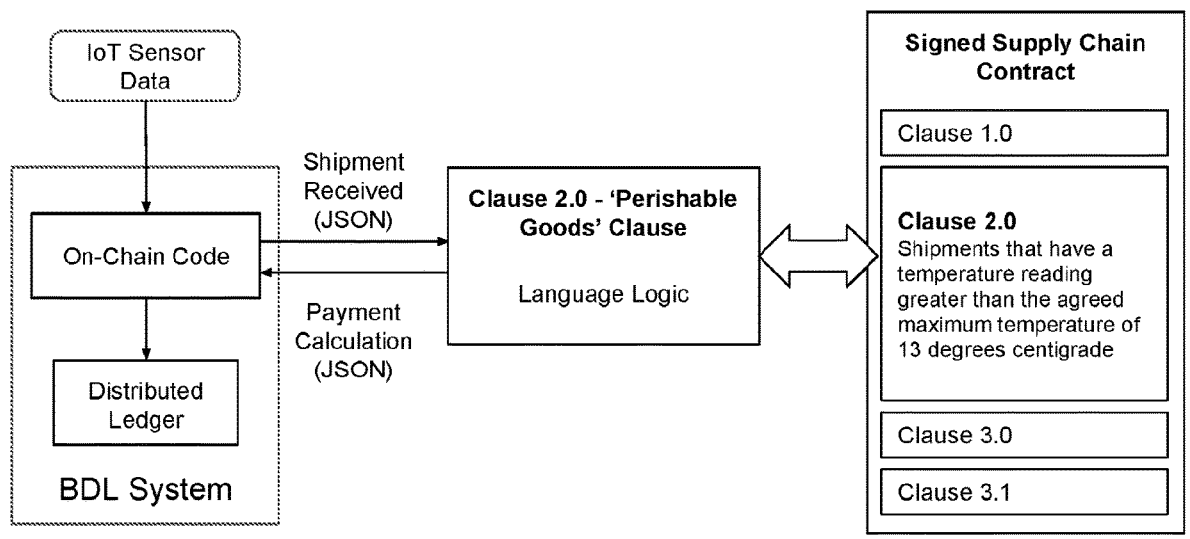
FIG. 13 is a depicting an application of the system and method in an exemplary scenario of enforcing a perishable goods clause of a contract using IoT sensor transaction inputs.

FIG. 6 depicts an exemplary interaction between an off-chain programmable clause in a contract and an on-chain script. More than one script may be used in a given embodiment of the system and method (e.g., one on-chain script may call another on-chain script). FIG. 13 depicts an example in which on-chain code of a BDL system interacts with a programmable clause within a contract. In this example, IoT data pertaining to temperature is instantiated on-chain as transactions relating to the status of a shipment (e.g., temperature and delivery status). This may result in an on-chain script executing and triggering a callout to an API of a programmable clause and thereby providing this data to the programmable clause in the contract (e.g. using JSON data, although any suitable approach may be used). The programmable clause logic may then return a response (in this example, a payment calculation based upon delivery status) that is then sent to 'on-chain' code to perform an on-chain transaction.

The system may offer a number of benefits over existing blockchain and distributed ledger systems. For example, the system may be more computationally efficient as all validating nodes on a BDL system may (as is typically the case) not have to process every computational action given that the contract may be, at least partially, computed 'off-chain'. As such, transaction or computation costs (e.g. 'gas') imposed by a BDL system can be reduced, where applicable, and only the transactions/state that require global state consensus may be actually executed or broadcast on-chain. For example, the computation, either in whole or in part, for a data-driven contract may be computed off-chain and the output pushed on-chain either to an on-chain script in an on-chain library to instantiate, deploy, or effect an on-chain transaction/operation; in a field on an-chain transaction (e.g. as an opcode, in a transaction data field, etc.); provide data inputs as an off-chain 'oracle'; or any other suitable approach/mechanism. Furthermore, the system and method may provide superior privacy and security properties as computation is not performed 'on-chain', but 'off-chain' as between the contracting parties, but may still retain the benefits of performing actions on-chain where beneficial (e.g., in a business network such as a supply chain—see FIGS. 10, 11, 12, and 13 as examples).

The computation environment may also be integrated with a multiplicity of blockchain/distributed ledger protocols and instances of each. For example, a contract executed using the system and method may integrate with two or more BDLs of the same or different protocols at the contract level. This is beneficial as various operations, transactions, and state may be needed to be performed or shared not solely on a single blockchain or distributed ledger (e.g., a tokenized asset transfer may be performed on a first BDL, a payment performed on second BDL, and state shared on a third BDL).

Furthermore, BDL-based "smart contract" systems typically couple on-chain execution and enforcement (i.e. execution is automatically enforced by consensus when on-chain operations are executed), which may have a number of undesirable implications for native usage with legal contracts. Firstly, legal contracts are typically 'incomplete' in nature as the future state of the world cannot be entirely known at the point of contract formation/execution. For example, future contingencies may not be capable of description ex ante, and contracting parties cannot commit themselves never to engage in renegotiation or modification during execution. Secondly, it is often desirable to waive rights against, and obligations imposed upon, counterparties in legal contracts. For example, commercial exigencies or best practices may dictate that a particular right or obligation is not enforced, which automated enforcement may often be antithetical to. Thirdly, contracting parties may wish to approve operations/transactions prior to their execution for a variety of reasons (e.g. compliance, workflow management, internal policies). Automated enforcement restricts the ability to before such manual checks and processes. By providing a computation abstraction layer to a BDL-based system, the system and method avoids the issues of coupling computation and enforcement together.

3. Method

Figure 2:
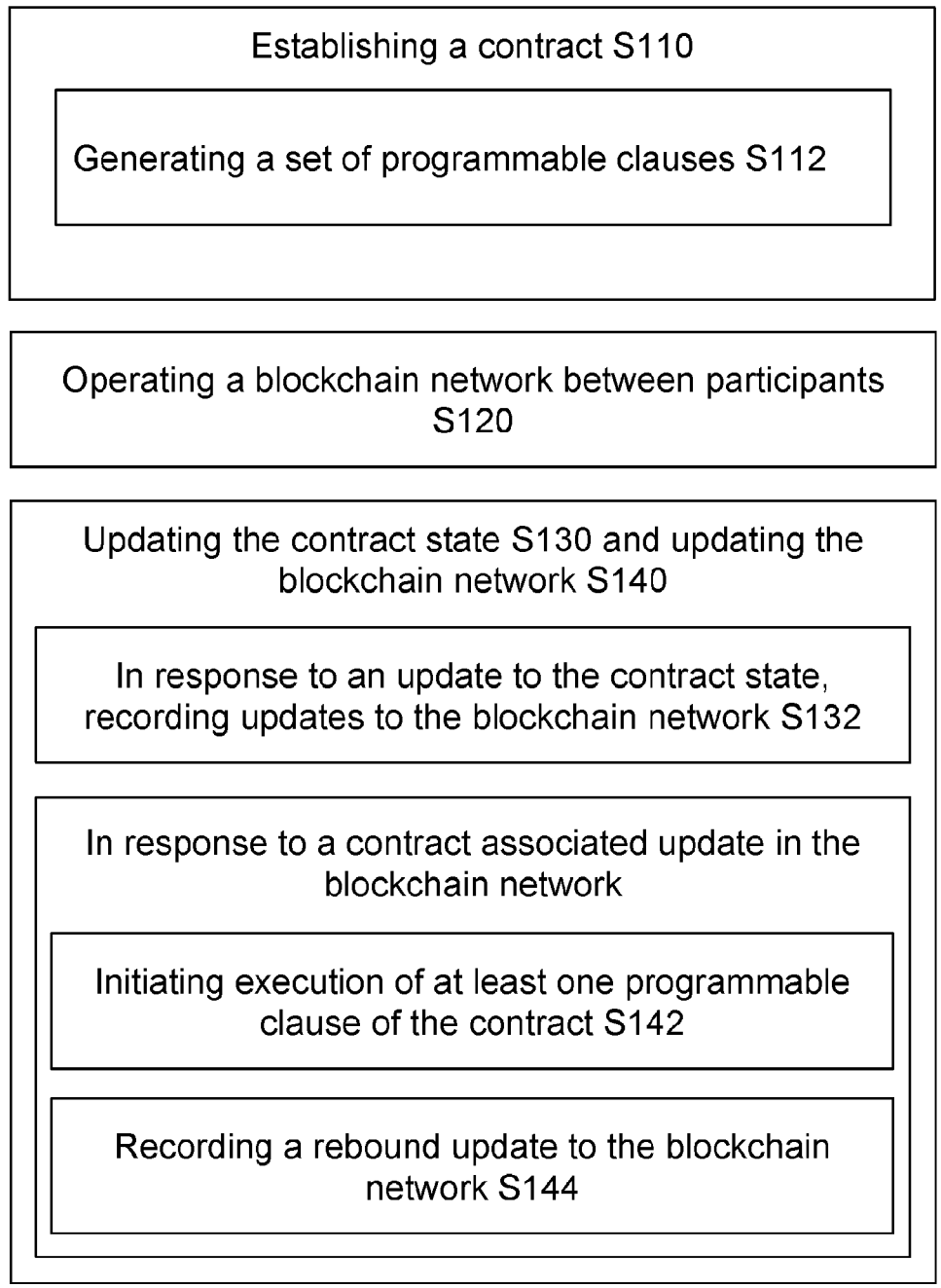
FIG. 2 is a flow diagram of a method of a preferred embodiment.

As shown in FIG. 2, a method for transitioning a blockchain-based network according to a legal contract may include: establishing a contract S110, which includes generating a set of programmable clauses for the contract S112; operating a blockchain network between participants S120; updating the contract state S130, and updating the blockchain network S140. Additionally, the method can include various scenarios of updating and transitioning the blockchain network, which can include: in response to an update to the contract state, recording updates to the blockchain network S132; and in response to a contract-associated update in the blockchain, initiating execution of at least one programmable clause of the contract S142 and recording a rebound update to the blockchain S144. In the initial scenario, changes in the state of the contract, which may be due to off-chain related activity, can trigger transitioning of the blockchain network. In the second scenario, the blockchain network may undergo transitioning wherein as a result to an update to the blockchain network, off-chain logic can be initiated and optionally, as a response to execution of the logic a subsequent update transacted with the blockchain network. The method functions in implementing a blockchain based network in association with a contract. The method is preferably implemented with the system described above, but may be alternatively implemented with any appropriate system.

Block S110, which includes establishing a contract, may function in creating a legal contract between two or more parties and that includes executable programmable logic. The contract may be any type of "electronic" contract that has executable logic. Preferably, the contract is a data-driven contract as described above that includes programmable clauses and natural language clauses (i.e. text/language based components). Establishing a contract may additionally include generating a set of programmable clauses for the contract S112. However, the method may alternatively be implemented wherein a data-driven contract is obtained or received by another source and wherein the method facilitates the use of the data-driven contract in guiding the transitioning of a blockchain network.

Establishing a contract may S110 preferably occurs in association with a contract management platform (CMP) as described previously. Alternatively, establishing the contract S110 may occur without the CMP. The contract may then be stored on a blockchain/distributed ledger (BDL) and/or on an off-chain repository. In the preferred variation wherein establishing the contract S110 occurs in association with the CMP, the contract is preferably stored using a contract repository system (CRS).

Block S112, which includes generating a set of programmable clauses, may function in incorporating executable logic into the contract, wherein a programmable clause preferably functions as the executable logic within the contract. A programmable clause may take the form of 'programmable clauses' as outlined in U.S. patent application Ser. No. 15/476,791, filed 31 Mar. 2017. Generating a set of programmable clauses S112 preferably includes implementing a templating system, wherein the templating system comprises of a template model that contains the logic of each programmable clause of the contract. Implementing the templating system adds programmable clauses to the contract by binding the programmable clause logic components to associated natural language of the contract. Generating a set of programmable clauses S112 may alternatively create programmable clauses using other methods, e.g. writing programmable clauses from scratch or obtaining them from a contract library. Additionally, parametric programmable clause components (i.e. variables) of the contract may be instantiated at this or any suitable time; and these values may be changed. Examples of instantiated variables may include, price of a product, sale date, and like, and such variables will depend on the objective of the programmable clause.

As mentioned above, generating a set of programmable clauses S112 may include implementing a templating system, which may function in creating a legal contract with programmable clauses. Implementing a templating system comprises of binding the template model for each programmable clause within the contract to the natural language of the contract. Implementing a templating system enables an easy and quick method to create legal contracts by reusing contract logic and associated natural language clauses. Templates may support multiple geographic regions, allowing the template to be edited or visualized in different languages, whilst preserving a single region-neutral executable representation.

In implementing the templating system, each programmable clause of the contract preferably has a corresponding template model. The template model of that programmable clause comprises of the data elements of that programmable clause. These data elements may then be incorporated into the contract using the template model. When establishing a contract S110, implementing the templating system may additionally create an API endpoint of the programmable clause thereby enabling an external client to instantiate logic of the programmable clause or submit input of any sort during execution of the contract. Additionally and/or alternatively, the template model may maintain links to the contract data elements, enabling dynamic network updates to data elements. For example, a data element in the template model corresponding to the price of oil, may allow the price of oil in the contract to change and stay up to date with the market oil price. Usage of external data, may occur over any desired network.

Block S120, operating a blockchain network between participants functions to set up a peer-to-peer network for implementation of the contract. The blockchain network preferably maintains an application model of the contract that maps to the template model. "Communication" between the template model and the application model enable dynamic updates of the contract state and execution of contract programmable clauses.

Operating a blockchain network S120 may comprise of generating and operating a new blockchain network specific to implementation of the contract, or may comprise of operating a previously existing blockchain network. In one variation, an application-specific blockchain network may be configured and operated using application modeling that corresponds to a template model of a contract. For example, a tool may be used to configure an application model of a blockchain network by defining assets, participants, transactions, and/or other elements and actions related to the particular application-specific use case. This application model may then be used in deploying the application model to a blockchain infrastructure and runtime thereby establishing and initializing a blockchain network. A number of participants preferably coordinate in the execution of the blockchain network. The resulting blockchain infrastructure and runtime may use blockchain consensus protocols to ensure validation of the blockchain data. Functionality of the application-specific blockchain network is preferably configured to support the execution of the contract in an operationally compatible manner. Additionally and/or alternatively, operating a blockchain network S120 may comprise of operating multiple blockchain networks (e.g. where two or more networks interoperate). The type of implemented blockchain networks will additionally determine the protocols the contract must follow (as per the implemented blockchain network).

The contracting parties preferably set the implementation of the contract with respect to the blockchain networks. The contracting parties are, preferably, themselves participants on the network. Thus, depending on the contract implementation, operating a blockchain network S120 may entail different types of communication between the blockchain network and the contract, although the end result is to preferably match the template model and the application model to some desired degree. Dependent on the degree of linkage with the template model, the application model may function as a versioned history, a so called audit-trail, of the contract state. The application model may together maintain the current state of the contract and all histories. In some implementations, the blockchain is updated and a CMP or other off-chain system element monitors the state of the blockchain network such that data from the blockchain network can serve as an input to the contract if necessary. Alternatively, on-chain scripts can be specified to initiate logic of a contract as specified below. In one variation, when establishing a contract, an API interface can be created for a programmable clause, and at least one application model object in the blockchain network is configured to initiate a callback request to the API endpoint.

Block S130, which includes updating the contract state, may function to change the state of the contract. Updating the contract state may occur through any internal or external interaction that leads to a change of the contract state. The contract state may be changed manually or through executing of the contract logic. Updating the contract state S130 may be participant implemented, or may be based on linked associations (e.g. the market price of grain may be linked to the contract price of grain). Through the mapping between the template model and the application model, updating the contract state S130 can lead to recording updates to the blockchain network S132. The inverse is preferably also true, updating the blockchain network may (depending on the configuration of the blockchain network) lead to updating the contract state S130.

Updating the contract state S130 may comprise of executing the logic of the contract. Execution of the logic is preferably performed at or through an execution engine. For a template created programmable clause (or more generally a contract), the execution engine invokes the execution logic for the template, passing in the parameterization data, one or more context objects, and the incoming request (FIG. 1(6)). The execution engine preferably validates the response and then returns it to the caller. The structure of the response may be modeled in the template model (FIG. 1(7)). The execution engine may take any suitable form, such as a runtime environment or virtual machine.

In one exemplary instance, updating the contract state may include receiving an external update request; updating the contract state in response to processing of the update request as specified by the logic; and communicating a response to the update request as shown in FIG. 9. For example, an on-chain script may execute through a runtime of a blockchain network and trigger a request to an API endpoint of a programmable clause (or the contract or other suitable endpoint) and handled by the execution engine. Execution of the logic of the programmable clause can result in changing of the contract state. A response is preferably communicated to the runtime of the blockchain network.

An alternative approach, such as when on-chain scripts are not available or used, may poll the blockchain network or request an update of the blockchain network and receive updates of the blockchain network as shown in FIG. 11. The contract state and subsequent updates may triggered based on the received updates Block S140, which includes updating the blockchain network, functions to update the state of the blockchain network in accordance to the application model. Updating the blockchain network S140 may additionally occur due to other external or internal inputs.

Through the link with the contract (e.g., using an API endpoint of the clause and/or contract), in response to at least one contract-associated update of the blockchain network, updating the blockchain network S140 can lead to initiating execution of at least one programmable clause of the contract S142. That is, external input from the blockchain may lead to a change in the contract state that occurs through initiating execution of at least one programmable clause of the contract S142. This external input may lead to recording a subsequent update to the blockchain network S142 to minor the contract state change. For example: a contract may include a temperature variable that is linked to a blockchain network. The application model of the blockchain network can be configured to define temperature data or assets. Contract integration may be manifested in a variety of ways described herein such as using smart contract scripts to call out to the execution environment, polling, or accessing the data in response to another event that triggers use of the data. This in turn may lead to a contract state change to update the temperature variable, which in turn would lead to a subsequent update in the application model to account for the contract state change.

Updating the contract state S130 may be dependent on the exact method of interaction and integration between the contract and external resources. Contracts may integrate with a variety of external resources as well as have internal integrations (e.g., between contract clauses). Integrations with external resources may comprise events (e.g., from the blockchain network, API, or otherwise) being exposed to a contract clause to affect a variety of internal operations within the clauses of the contract, as well as to drive external actions from the contract. Such external actions may include (but are not limited to): calls to APIs (e.g., to provide data to a web service, etc.), pushing objects to one or more BDLs (e.g., state updates and data pertaining to a clause/contract as in FIGS. 4A and 4B), calls to on-chain scripts (i.e., 'smart contract' code on a BDL) such as an on-chain library such as in FIG. 12, passing data to on-chain 'smart contract' code, compilation to bytecode of a virtual machine (e.g., a BDL runtime system), executing operations on IoT/network-connected devices, storing data in a database, or any other appropriate action. These may occur in a manner substantially similar to that outlined U.S. patent application Ser. No. 15/476,791. Other appropriate approaches may also be used additionally or alternatively. A contract may additionally perform internal operations. For example, an input to a clause in the contract may result in that clause calling a function in another clause, passing data to another clause, or any other appropriate operation. These internal operations may facilitate clause interoperability and the generation of more sophisticated contract logic. A clause may also perform an external action based upon an internal operation (e.g., clause 1 calls clause 4, which outputs data to an external resource) or vice-versa.

In one example, data may be input and output through the CSS. The CSS may be stateless (e.g., backed by an object store of any appropriate form) or may have a state. A CSS is preferably content-addressable storage. A contract (and by extension it's constituent clauses) may use data from the CSS or output data to the CSS. In one implementation, data may be pushed to the CSS from external resources and then used by the contract. In another implementation, data may be pushed to a BDL, Merkle DAG-based data structure, or other time-series based append-only log, prior to being used by the contract as an input. In another usage scenario, data from the CSS may be used by a clause to perform operations dependent (wholly or partially) upon past data (e.g., state of a contract at a given time in the past, actions that occurred subsequent to a state change, operations that require use of a variety of past data point such as compounded penalty deductions, etc.).

Figure 20:
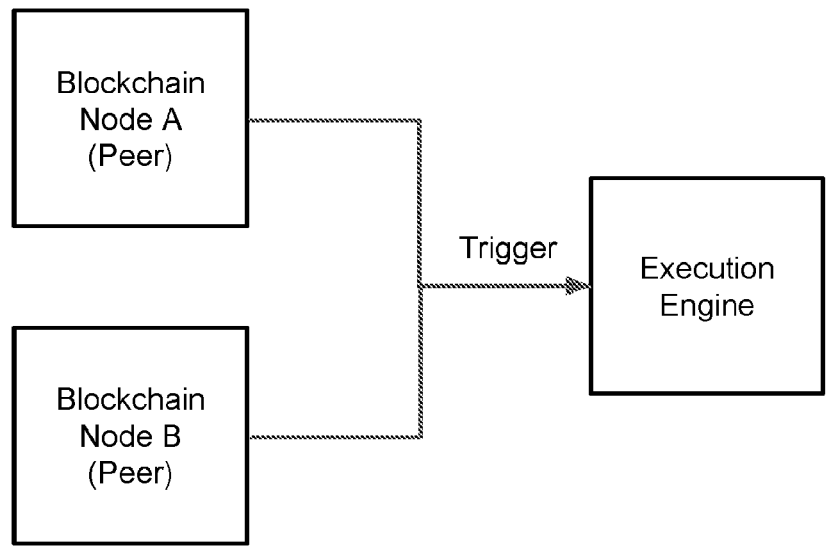
FIGS. 20-23 are schematic representations of exemplary implementation scenarios of the method.

As mentioned previously, the method of implementation of the contract with respect to the blockchain network may affect the interaction between the contract and the blockchain network. In a first scenario variation, the contract is maintained on a private server/network (off-chain), and the participants access the contract through the blockchain network, as shown in FIG. 20. In this variation, operating the blockchain network S120 may comprise of calls and responses to the private server to transition the state of the contract, which may subsequently transition the state of the network. In this scenario variation, a BDL network is the primary data store and the network transitioned by the contract (e.g. storing the state of the including the interaction with a contract or series of contracts), and contract logic can be offloaded to a private, off-chain runtime environment between the contracting parties and other participants—whether in the network or otherwise. This may be to avoid integration of contract logic within the on-chain code/scripts used in operating the BDL network, and to decouple the contract runtime from the runtime used in operating and maintaining BDL. This separation of concerns may enable the BDL system and contract system to be maintained, governed, and operated with a degree of relative independence. The BDL can be updated with data updates, which may originate from a variety of sources. The application model of the BDL network can then serve as an input to the contract and used to trigger processing of logic of the contract. The server in this scenario can serve as a dedicated and trusted environment for the execution of contract logic for BDL network participants. Network participants may be contracting parties but could be other parties, possibly with no direct interest in the contract. However, each participant can maintain their own copy of the distributed ledger/blockchain state.

Figure 21:
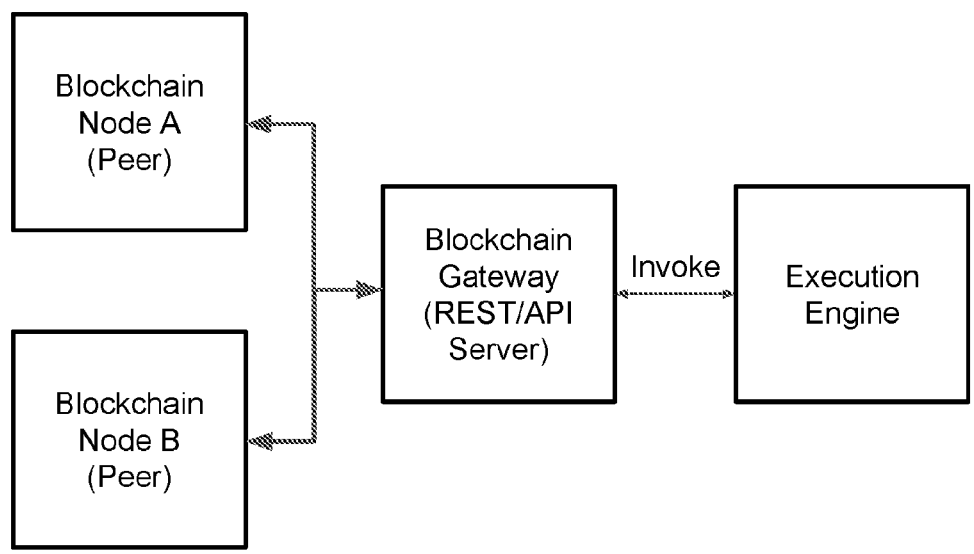

In a second scenario variation, the contract is maintained on a private server/network (off-chain), and the participants access the contract directly through the private server as shown in FIG. 21. In this variation, the contract logic is executed off-chain, the contract participants may interact with the contract through a CMP or other central platform, and the output from the contract can be both on the off-chain server and on the blockchain network (on-chain). Operating a blockchain network S120 may then comprise of input/output integration between the blockchain network and the private server. More specifically, input/output integration between the logic of the contract and internal and external sources are linked to the logic of the contract. Updating the contract state S130 may thus occur from any internal or external input. For example, a market change in the price of crude oil may, for example, lead to updating a variable in a clause dependent upon the price, thereby updating the contract state S130, which in turn may lead to recording updates to a blockchain network S132. Updates may also be applied to external systems (e.g. ERP systems) via API.

Figure 27A:
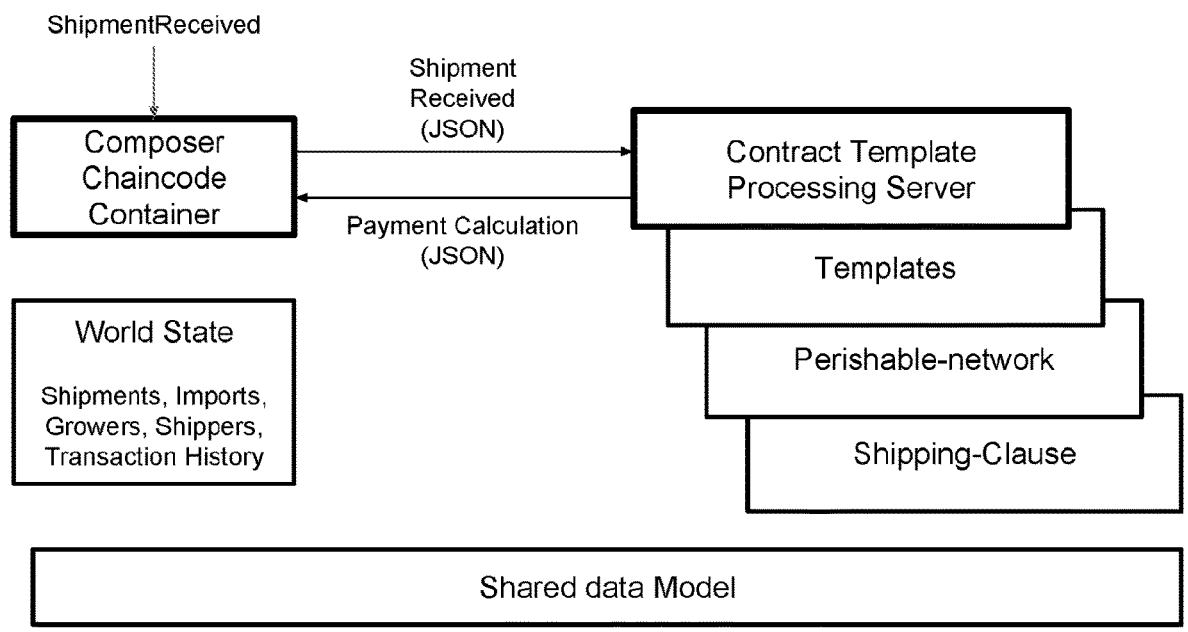
FIG. 27A is a high level architecture of an example for a perishable goods use case.

One exemplary implementation of the second scenario variation may involve a business application network (which preferably exists on top of a blockchain network) that invokes the execution engine running on an off-chain server. As shown in the example of FIGS. 27A-27I, a blockchain network configured for an application model specific to perishable goods use case may be transitioned in coordination with a 'perishable goods' clause of a data-driven contract. The method may store the contract state onto the blockchain network or recording outputs from the contract onto the blockchain network, while executing contract logic off-chain. A modeling system can be used to store the state of shipments, importers, growers, shippers on the blockchain, while the contract logic is invoked off-chain using the server. Accordingly, various entities can use the blockchain network to record data, and upon configured events like a shipment being received, then off-chain logic can be invoked to calculate a final price payable under the contract based on the recorded data, and that resulting price recorded back to the blockchain network. FIG. 27A shows the high level architecture of a contract with a 'perishable goods' clause. A data model, at least partially shared by or otherwise integrated between, the application model of the blockchain network and the template model enables interoperability between the blockchain network and off-chain logic. As a result, FIG. 27B shows the shipment being tracked on the blockchain network.

The identities of the participants in the permissioned blockchain network may be managed by the blockchain network, and their metadata may be managed by the contract data model. FIG. 27C shows the participant state stored on the blockchain network. Transactions can be submitted that update the state of assets stored on the blockchain based on the results of executing a contract. FIG. 27D shows a simulation of submitting exemplary IoT transactions (i.e., temperature readings from a network-connected device monitoring the shipment status). Both the contract data model and the templating system may be model driven, so we start by defining the data model, and may preferably use the same modeling language to obviate or minimize needs for complex mapping between the two. FIG. 27E shows the template model, using the modeling language, to show the shipment that is being stored on the blockchain network, as well as some of the transactions that update the state of the shipment.

The blockchain network may include a transaction processor function (e.g., an on-chain script) that invokes the execution engine on the server. FIG. 27F is a transaction processor function for the ShipmentReceived transaction. As shown in the return statement in FIG. 27F, a server call may pass in data from the incoming transaction. After calling the server, the function can update the state on the blockchain network. FIG. 27G is an exemplary template grammar for the template. The template grammar is the natural language text for the clause with embedded variables. A template is preferably strongly-typed and the type-information is captured in the template's template model. FIG. 27H is the template model for an exemplary 'perishable goods' template clause. The template model captures the names and types for variables referenced in the template grammar. The template model can reference or include complex types, such as Shipment or Duration. The template grammar and template model may be combined and used to generate a parser for the template. The model may be wholly or partially generated from the grammar such that a user does not have to interact with the two independently. The parser takes input source text and converts it to an instance of the template model. Templates may include the executable business logic, which implements a function that receives an incoming transaction and the data and returns a response transaction. FIG. 27I shows exemplary business logic for the perishable-goods template written in JavaScript. As aforementioned, other languages and approaches to expressing the logic may be used.

Figure 22:
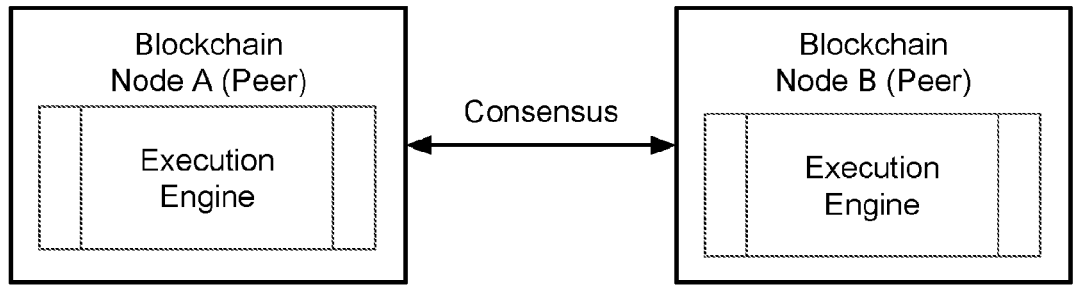

In a third scenario variation, the contract is directly maintained on a blockchain network. The contract is embedded and maintained in a blockchain network node(s). In this variation, the contract can be made executable through an execution environment (e.g., WebAssembly-based virtual machine, Node.js runtime engine, etc.) as shown in FIG. 22. Each participant may then interact and execute the contract individually using a runtime (e.g., a virtual machine, container, etc.) on the blockchain network. Consensus is preferably performed across peers on the network.

Figure 23:
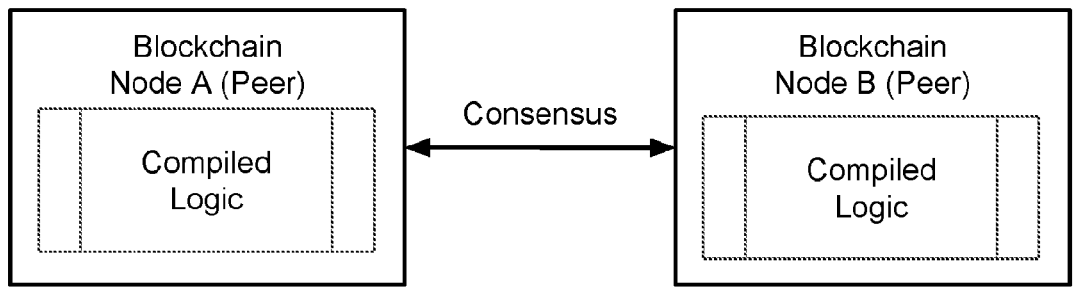

In a fourth scenario variation, the contract is maintained and executed on a blockchain. In this variation, the method further includes compiling the logic of the contract to native format of the execution platform/environment of the blockchain network as shown in FIG. 23. For example, for a 'legal' contract to be executed on an Ethereum-based network, the contract is first compiled into eWASM or EVM bytecode, or another supported compilation target (see, for example, FIG. 14). Similarly to the third scenario variation, consensus over the current contract state may be required during execution the contract. The third and fourth scenarios are not dependent on trust in an intermediary for storage of contract data or execution of contract logic.

The exemplary scenarios may use variations of the other scenario variations or description here. For example, a single contract may make use of the first scenario and the second scenario during its active use.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

What is claimed is:

1. A method comprising:
updating a state of an electronic document, the electronic document comprising a programmable clause implemented using a template model defining input data to execute the programmable clause and defining data output by the programmable clause, wherein the template model is mapped to an application model recorded in a blockchain network;
in response to updating the state of the electronic document, recording a first update to the blockchain network using the application model;
in response to recording the first update to the blockchain network:
determining, based on the input data defined by the template model, a value for the input data; and
invoking execution logic of the template model, wherein the execution logic of the template model is configured to, in response to the invoking, generate a second update based on the determined value of the input data; and
recording the second update in the blockchain network.

2. The method of claim 1, wherein updating the state of the electronic document comprises determining a change for a value for a variable of the electronic document.

3. The method of claim 2, wherein determining the change for the value comprises polling data.

4. The method of claim 2, wherein determining the change for the value comprises accessing data in response to an event.

5. The method of claim 2, wherein determining the change for the value comprises receiving a data update from a network-connected device.

6. The method of claim 1, wherein the execution logic of the template model is configured to generate the second update based on the determined value of the input data and further based on one or more of an external action or an internal integration.

7. The method of claim 6, wherein the programmable clause is a first programmable clause, wherein the electronic document comprises a second programmable clause, and wherein the internal integration comprises a call from the first programmable clause to the second programmable clause.

8. The method of claim 6, wherein the external action comprises calling an application programming interface, pushing an object to the blockchain network, or calling an on-chain script.

9. The method of claim 1, further comprising:
creating an application programming interface endpoint of the programmable clause; and receiving, at the application programming interface endpoint of the programmable clause, a callback request from at least one application model object in the blockchain network.

10. A system comprising one or more processors having access to memory, the one or more processors configured to:
update a state of an electronic document, the electronic document comprising a programmable clause implemented using a template model defining input data to execute the programmable clause and defining data output by the programmable clause, wherein the template model is mapped to an application model recorded in a blockchain network;
in response to updating the state of the electronic document, record a first update to the blockchain network using the application model;
in response to recording the first update to the blockchain network:
determine, based on the input data defined by the template model, a value for the input data; and
invoke execution logic of the template model, wherein the execution logic of the template model is configured to, in response to the invoking, generate a second update based on the determined value of the input data; and
record the second update in the blockchain network.

11. The system of claim 10, wherein to update the state of the electronic document, the one or more processors are configured to determine a change for a value for a variable of the electronic document.

12. The system of claim 11, wherein to determine the change for the value, the one or more processors are configured to poll data.

13. The system of claim 11, wherein to determine the change for the value, the one or more processors are configured to access data in response to an event.

14. The system of claim 11, wherein to determine the change for the value, the one or more processors are configured to receive a data update from a network-connected device.

15. The system of claim 10, wherein the execution logic of the template model is configured to generate the second update based on the determined value of the input data and further based on one or more of an external action or an internal integration.

16. The system of claim 15, wherein the programmable clause is a first programmable clause, wherein the electronic document comprises a second programmable clause, and wherein the internal integration comprises a call from the first programmable clause to the second programmable clause.

17. The system of claim 15, wherein the external action comprises calling an application programming interface, pushing an object to the blockchain network, or calling an on-chain script.

18. The system of claim 10, wherein the one or more processors are further configured to:
create an application programming interface endpoint of the programmable clause; and
receive, at the application programming interface endpoint of the programmable clause, a callback request from at least one application model object in the blockchain network.

19. Non-transitory computer-readable storage media storing executable instructions that, when executed by one or more processors, cause the one or more processors to:
update a state of an electronic document, the electronic document comprising a programmable clause implemented using a template model defining input data to execute the programmable clause and defining data output by the programmable clause, wherein the template model is mapped to an application model recorded in a blockchain network;
in response to updating the state of the electronic document, record a first update to the blockchain network using the application model;
in response to recording the first update to the blockchain network:
determine, based on the input data defined by the template model, a value for the input data; and
invoke execution logic of the template model, wherein the execution logic of the template model is configured to, in response to the invoking, generate a second update based on the determined value of the input data; and
record the second update in the blockchain network.

20. The non-transitory computer-readable storage media of claim 19, wherein to update the state of the electronic document, the instructions cause the one or more processors to determine a change for a value for a variable of the electronic document.

* * * * *